(12) United States Patent
Yajima et al.

(10) Patent No.: US 8,519,864 B2
(45) Date of Patent: Aug. 27, 2013

(54) STATUS INDICATOR

(75) Inventors: Hideaki Yajima, Kawasaki (JP);
Kazuya Nishida, Kawasaki (JP);
Wataru Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 12/552,686

(22) Filed: Sep. 2, 2009

(65) Prior Publication Data

US 2010/0060476 A1 Mar. 11, 2010

(30) Foreign Application Priority Data

Sep. 9, 2008 (JP) ................................ 2008-230948

(51) Int. Cl.
*G08B 5/00* (2006.01)
(52) U.S. Cl.
USPC ...................................... 340/815.65; 439/490
(58) Field of Classification Search
USPC .................... 340/815.65; 439/490; 349/490; 345/240, 204
See application file for complete search history.

(56) References Cited

U.S. PATENT DOCUMENTS

| | | | |
|---|---|---|---|
| 2002/0135572 A1* | 9/2002 | Weindorf | 345/204 |
| 2003/0002822 A1 | 1/2003 | Ishihara et al. | |
| 2007/0155223 A1* | 7/2007 | Huang et al. | 439/490 |
| 2008/0277307 A1* | 11/2008 | Mazur | 206/534 |

FOREIGN PATENT DOCUMENTS

| | | |
|---|---|---|
| JP | 7-32604 U | 6/1995 |
| JP | 10-170734 A | 6/1998 |
| JP | 10-275535 | 10/1998 |
| JP | 2000-347605 | 12/2000 |
| JP | 2001-116961 A | 4/2001 |

OTHER PUBLICATIONS

"Japanese Office Action" mailed by JPO and corresponding to Japanese application No. 2008-230948 on Aug. 7, 2012, with partial English translation.

Japanese Office Action mailed Mar. 12, 2013 for corresponding Japanese Application No. 2008-230948, with Partial English-language Translation.

\* cited by examiner

*Primary Examiner* — Shirley Lu
(74) *Attorney, Agent, or Firm* — Fujitsu Patent Center

(57) ABSTRACT

A device for indicating a device status includes a plurality of light guides including a first end for receiving light and a second end for displaying light, respectively; a plurality of light emitting elements arranged to face to each of the first ends; and a light shield arranged between the light guides and extending between light emitting elements, the light shield shielding light from the light emitting elements.

3 Claims, 25 Drawing Sheets

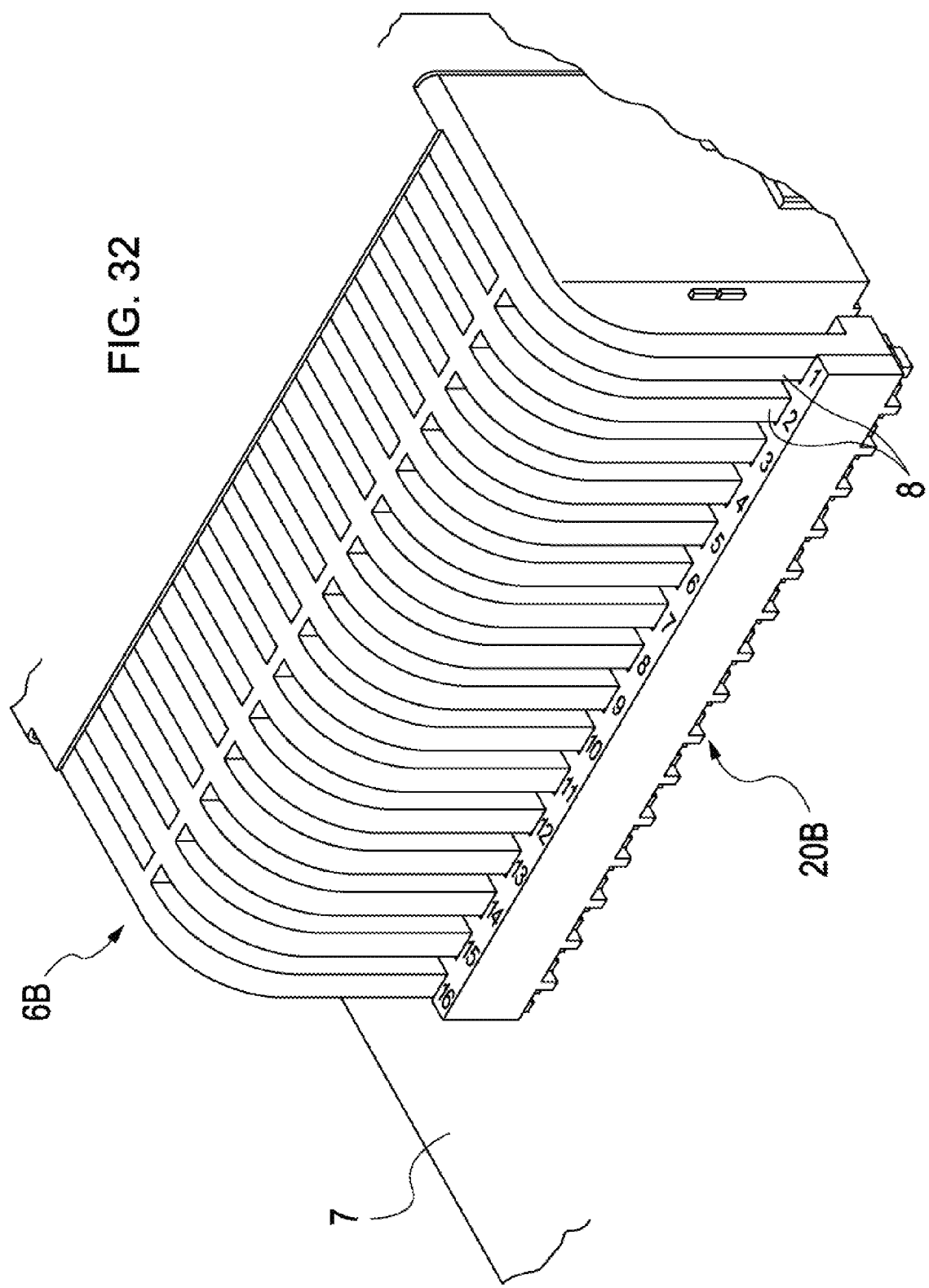

STATUS INDICATOR

CROSS-REFERENCE TO RELATED APPLICATIONS

This application is based upon and claims the benefit of priority of the prior Japanese Patent Application No. 2008-230948, filed on Sep. 9, 2008, the entire contents of which are incorporated herein by reference.

FIELD

The present invention relates to a status indicator displaying an operation state.

BACKGROUND

In an optical transmission apparatus as an example of an electronic apparatus, a status indicator displays an operation state of a plurality of optical modules connected to each interface card inserted in the optical transmission apparatus is provided in many case. For example, in a portion at which a plurality of optical modules are connected with the status indicator including a green light emitting element, a red light emitting element and an orange light emitting element. The green light emitting element indicates that the optical module is in a normal status in which the optical module can be normally operated. The red light emitting element indicates that the optical module is in an abnormal state in which the optical module can not be normally operated due to a failure or the like. The orange light emitting element indicates that the optical module is in a waiting state such as in an operating test or the like. The red light emitting element, the green light emitting element, orange light emitting element, and the like light emitting element are referred to as a part.

A number of status indicators are arranged on an interface card since a number of optical modules are arranged in a line to the interface card to correspond to each optical module. Specifically, the status indicator is arranged at a front side of a cage to which the optical module is connected. The front side of a cage includes connectors.

When the light emitting element such as an LED is used for the status indicator part itself, it is required to provide one or a plurality of light emitting element to each optical module. However, it is difficult to assure a space for providing the light emitting element at the front side of the cage in the optical transmission apparatus that is highly densified.

Consequently, in the optical transmission apparatus in which the optical modules are highly densified, the cage itself is not equipped with the light emitting element, and the light emitting element such as an LED is mounted on a substrate on which the cage is mounted. Accordingly, a light guide for guiding the light from the light emitting element such as an LED on the substrate to the status indicator part at the front side of the cage is provided outside the cage. The light guide is an elongated transparent plastic component, and is referred to as a light pipe. The light guide can transmit light similarly to an optical fiber.

An end face (light receiving surface) of the light guide at one end side is disposed near the light emitting element, and the light from the light emitting element is introduced into the light guide from the light receiving surface and is emitted from an end surface at the opposite side. Herewith, the end face at the opposite side of the light guide emits the light of the same color as the light emitting element and status indicator is performed. That is, the end face opposite to the right receiving surface of the light guide works as the aforementioned status indicator part.

In the case where the light emitting element emits light of a plurality of colors (for example, LED that emits light of three colors of red, green, and orange), only one light guide is provided to correspond to each optical module. However, since the LED that emits light of a plurality of colors has a large variation in emission color, there is a possibility that the emitting state is misidentified. Consequently, it is preferable that the light emitting element is individually provided to correspond to each of a plurality of colors when the plurality of colors are displayed.

In the case where the light emitting element is individually provided to correspond to each of the plurality of colors, and when operation or non-operation of each optical module is displayed, two light emitting elements are mounted on the substrate with respect to one light guide provided to correspond to each optical module (that is, each connector). Further, when operation, waiting, or non-operation of each optical module is displayed, three light emitting elements are mounted on the substrate with respect to one light guide. Further, since a number of light modules are connected to the cage in the line, the light emitting elements whose number is the same as the number of the optical modules (that is, the number of the light guides) or double or triple number of light emitting elements are closely mounted on the substrate.

In this manner, since the light emitting element is arranged with respect to each of a number of light guides that are closely arranged, the distance between the light emitting elements becomes narrow on the substrate. Particularly, in the optical transmission apparatus that is highly densified, the distance between the light guides becomes narrow, so that the distance between the light emitting elements becomes extremely narrow with it.

As described above, if the distance between the light emitting elements with respect to each of the adjacent light guides becomes narrow, there is a risk that the light from the light emitting element opposing one light guide is introduced into the adjacent light guide. If the upper surface of the light emitting element and the end face (light receiving surface) of the light guide is close to a contact level, leakage of the light into the adjacent light guide can be ignored. However, An actual device structure includes a distance between the upper surface of the light emitting element and the end face (light receiving surface) of the light guide in consideration for a size tolerance for processing or a size tolerance for assembling of a component, so that there is a case that leakage of the light into the adjacent light guide may not be ignored. For example, if red light for the adjacent light guide is leaked and introduced into the light guide transmitting green light, the status indicator emits orange light instead of original green light so as to mix green and red in the light guide. Therefore the status indicator in a different operation state displaying.

As described above, if the distance between the light guides are narrowed, the light form the light emitting element not only introduce into the one light guide in connection with the emitting element but also leak and introduce into an adjacent light guide. Therefore, the user may misidentify color of light at status indicator so as to indicate different color light from the original color.

Herein, in the structure in which light is introduced into each of the adjacent light guides from the adjacent light emitting elements, it has been proposed that a notched part is provided at a coupling unit between the adjacent light guides to scatter the light from the adjacent light emitting element by the notched part, thereby preventing optical leakage (for example, see Japanese Laid-open Utility Model Publication No. 7-32604). Further, in the optical module equipped with a transmission signal light emitting element and a reception signal light emitting element, it has been proposed to provide a partitioning plate having a light shielding property to separate optical pathway of transmission signal light and reception signal light (for example, see Japanese Laid-open Patent Publication No. 2001-116961).

The notched part disclosed in Japanese Laid-open Utility Model Publication No. 7-32604 is provided at the coupling unit in which portions of the adjacent light guides at a rear side of the light receiving surface are integrally connected, and leaked light is scattered by a slope surface of the notched part to prevent introduction into the adjacent light guide. Accordingly, when the coupling unit of the light guides (correspond to light guides) is provided at the rear side of the light receiving surface, leakage of light may be prevented by providing the notched part. However, when the coupling unit of the light guides of the optical transmission apparatus is provided at a front side of the light receiving surface, there is no effect to prevent leakage of light even when the notched part is provided.

Further, the partitioning plate disclosed in Japanese Laid-open Patent Publication No. 2001-116961 is provided to may prevent that transmission signal light is reflected and returned by an end face of one optical fiber and is introduced into the light receiving element, and not to may prevent that the light leaked from the adjacent light emitting element is introduced into the optical fiber. Accordingly, since the structures of the light emitting element and the optical fiber (light guide) are absolutely different, the partitioning plate disclosed in Japanese Laid-open Patent Publication No. 2001-116961 may not be applied to the light guide for the aforementioned optical module.

SUMMARY

According to an aspect of the invention, a device for indicating a device status includes a plurality of light guides including a first end for receiving light and a second end for displaying light, respectively; a plurality of light emitting elements arranged to face to each of the first ends; and a light shield arranged between the light guides and extending between light emitting elements, the light shield shielding light from the light emitting elements.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 32 is a perspective view of a state where the light shield on which numbers are displayed on the upper surface is attached to the light guides.

DESCRIPTION OF EMBODIMENTS

Figure 1:
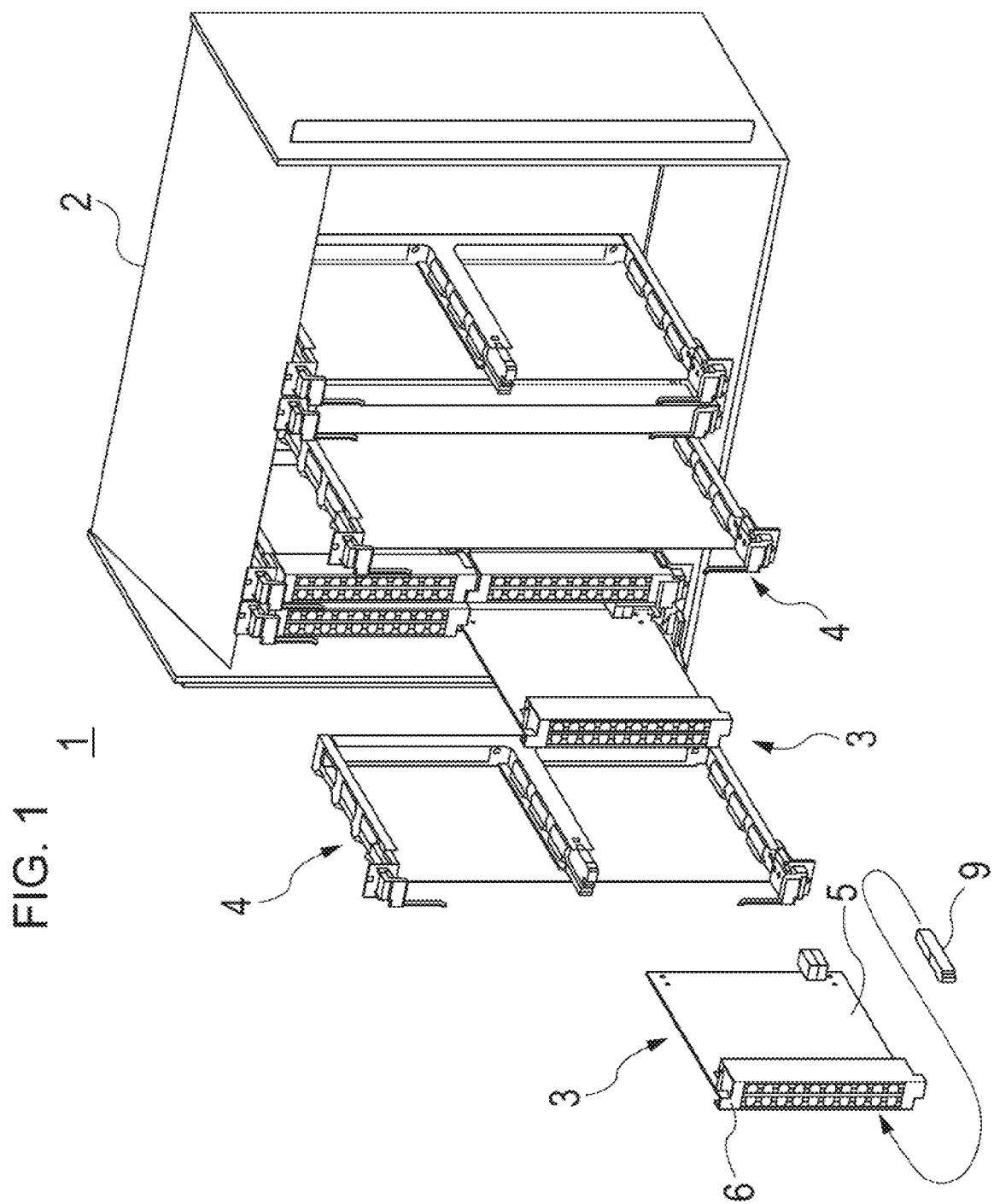
FIG. 1 is an exploded perspective view of an optical transmission apparatus which is an example of an electronic apparatus to which an operation status indicator structure according to an embodiment is applied.

FIG. 1 is an exploded perspective view of an optical transmission apparatus which is an example of an electronic apparatus to which an operation status indicator according to an embodiment is applied.

The optical transmission apparatus 1 illustrated in FIG. 1 is an apparatus of so called a book shelf type, and is capable of accommodating a number of plug-in units 3 (interface card) in a housing 2. The plug-in unit 3 is inserted in a mounting frame 4, and the mounting frame 4 is inserted in the housing 2 of the optical transmission apparatus 1.

The plug-in unit 3 includes a printed substrate 5 on which a signal transmission circuit is formed, an SFP (Small Form-Factor Pluggable) cage 6 which is a connector mounted on the printed substrate 5. A number of SFP (Small Form-Factor Pluggable) modules 9 as optical transmission and reception modules can be accommodated in the SFP cage 6. The SFP module 9 is a standard module that is standardized and generally used in the field of the optical transmission apparatus. Accordingly, the SFP cage 6 accommodating the SFP module 9 is also standardized in the filed of the optical transmission apparatus.

Figure 2:
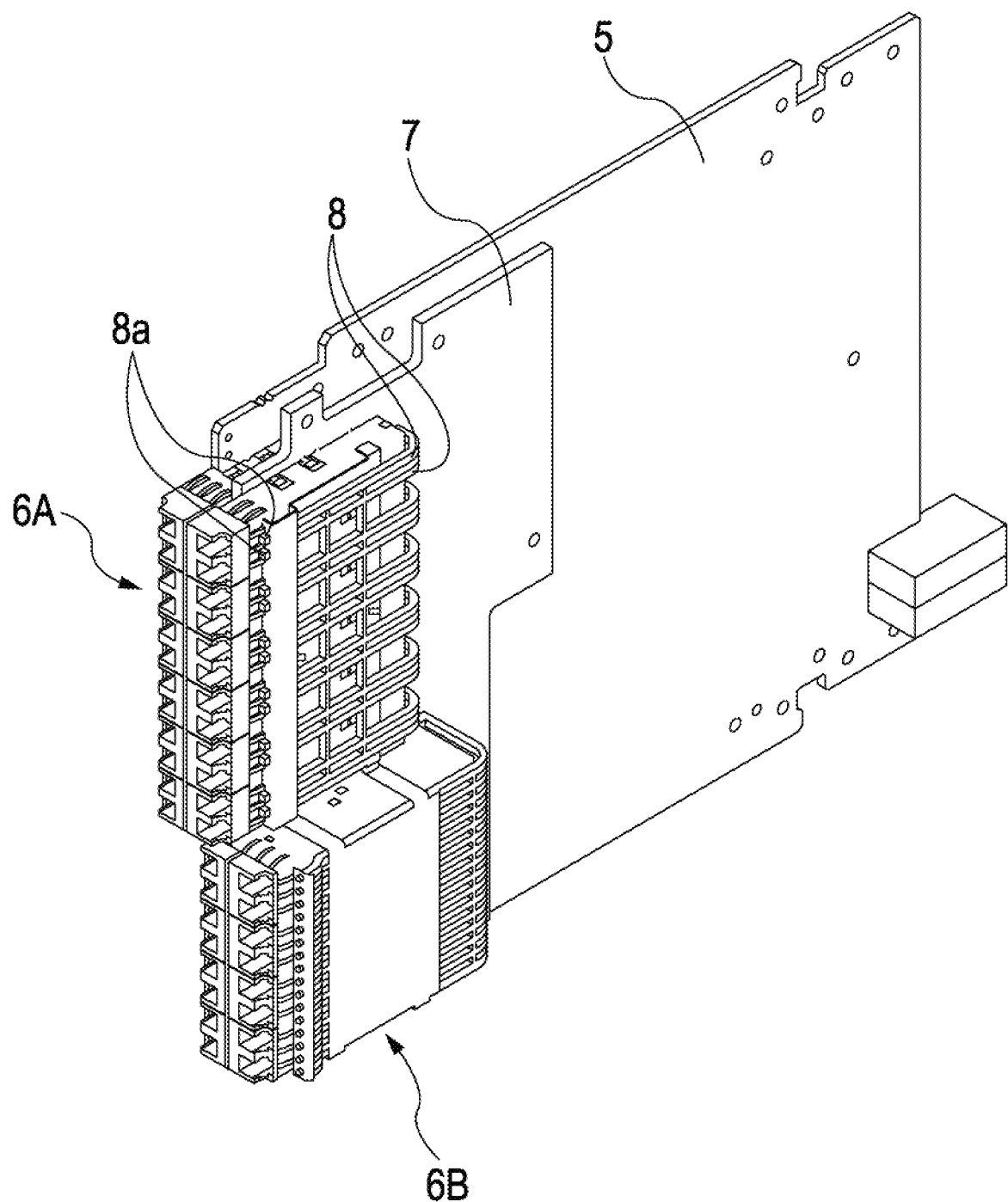
FIG. 2 is a perspective view illustrating an example a plug-in unit illustrated in FIG. 1.

FIG. 2 is a perspective view illustrating an example of the plug-in unit 3 illustrated in FIG. 1. The plug-in unit 3 includes the printed substrate 5. The SFP cage 6 is mounted on the printed substrate 5 via a printed substrate 7 smaller than the printed substrate 5. That is, first, the SFP cage 6 is mounted on the printed substrate 7, and then, the printed substrate 7 is mounted on the printed substrate 5.

Herein, as the SFP cage, the SFP cage 6A illustrated at the upper side of FIG. 2 is an SFP cage of a double side mount type and is a six sequence type. That is, two SFP cages 6A are respectively mounted on the both sides of the printed substrate 7, and each of the SFP cage 6A has six connection parts into which the SFP module 9 is inserted to be connected.

On the other hand, the SFP cage 6B illustrated at the lower side of FIG. 2 is an SFP cage of a two-storied type and is an eight sequence type. That is, the SFP cage 6B has eight connection parts into which the SFP module 9 is inserted to be connected. Four SFP cage 6B are aligned in a line, and four of the SFP cage 6B are further aligned in the line thereon.

Although not illustrated in FIG. 2, an LED as a light emitting element for status indicator is mounted on the printed substrate 7. The light from the LED is introduced into a light receiving surface of a light guide 8 that is an optical guide member, and is introduced to a display part 8a formed at a head at the opposite side.

Figure 3:
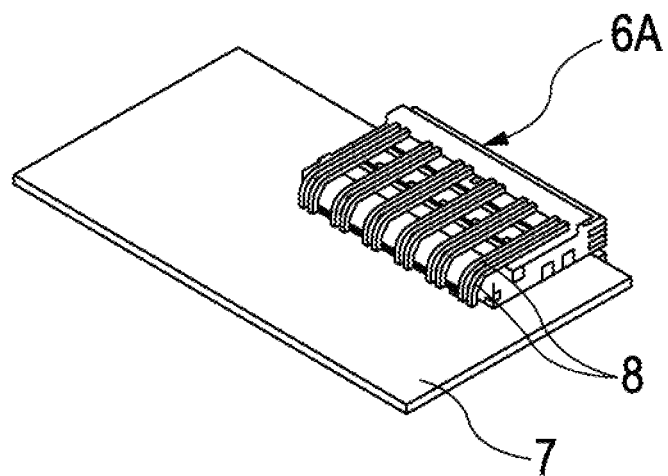
FIG. 3 is a perspective view of a double side mount type SFP cage mounted on a printed substrate viewed from the rear side.
Figure 4:
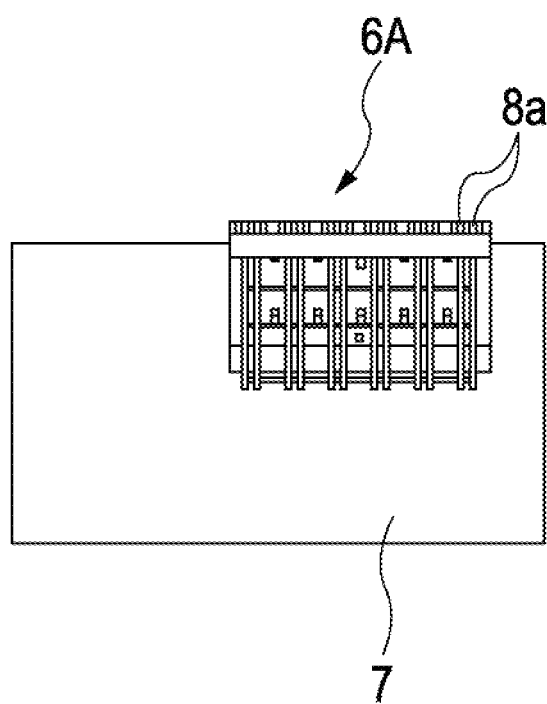
FIG. 4 is a plan view of the double side mount type SFP cage mounted on the printed substrate.
Figure 5:
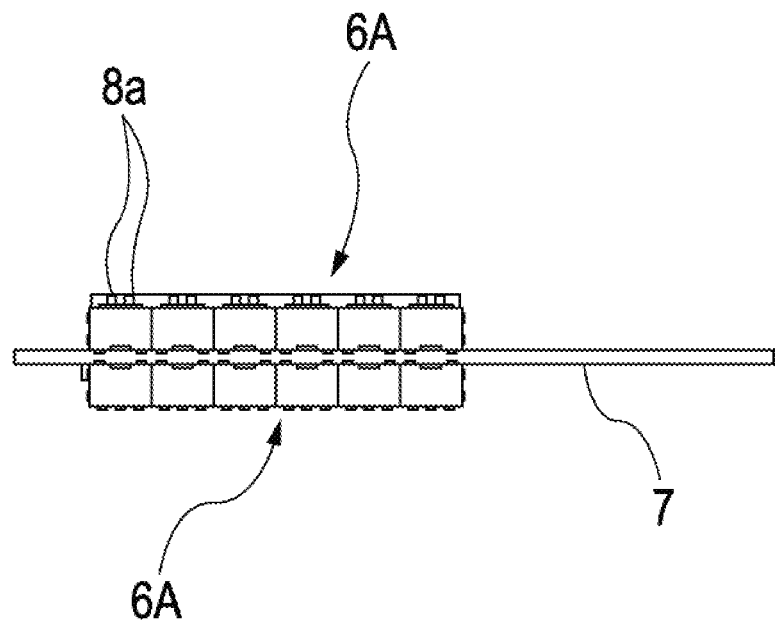
FIG. 5 is a front view of the double side mount type SFP cage mounted on the printed substrate.
Figure 6:
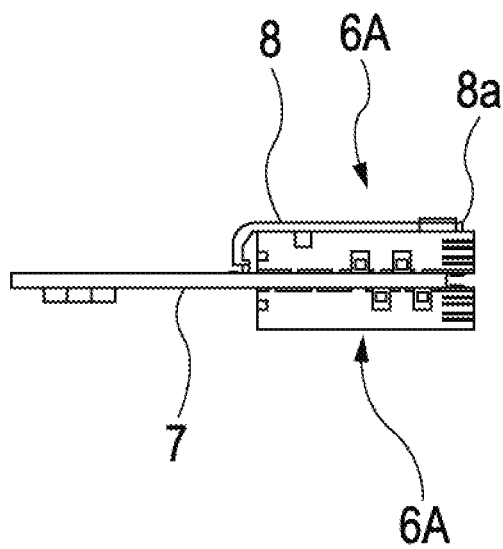
FIG. 6 is a side view of the double side mount type SFP cage mounted on the printed substrate.

FIG. 3 is a perspective view of the SFP cage 6A mounted on the printed substrate 5, and the state of the SFP cage 6A viewed from a rear side is illustrated. FIG. 4 is a plan view of the SFP cage 6A mounted on the printed substrate 5. Further, in FIGS. 3 and 4, the printed substrate 5 is illustrated to have a rectangular shape for simplification. Further, FIG. 5 is a front view of the SFP cage 6A mounted on the printed substrate 5, and FIG. 6 is a side view of the SFP cage 6A mounted on the printed substrate 5.

As illustrated in FIGS. 3 to 6, the light guide 8 is provided at only one of the two SFP cages 6A, and rises up from the vicinity of the printed substrate 5 at the rear side of the SFP cage 6A, follows the back surface and the upper surface of the SFP cage 6A, and extends to the display part 8a near the front surface of the SFP cage 6A. In the example illustrated in FIGS. 3 to 6, a plurality of light guides 8 (12 set of light guides in the example illustrated in FIGS. 3 to 6) are provided only to the one SFP cage 6A. The connection parts into which the SFP modules are inserted to be connected are overlapped two by two, and two light guides 8 are adjacently provided to correspond to the positions of the two connection parts. Accordingly, the same number of the light guides 8 as the number of the connection parts of the both SFP cages 6A are provided to one SFP cage 6A.

In addiction, the plurality of light guides 8 are connected by a coupling unit that crosses the light guides 8 so as to be formed monolithic. In this manner, the plurality of light guides 8 are attached to one of the SFP cages 6A as a monolithic component. An LED as the light emitting element is provided between an end (light receiving surface) of each light guide 8 and the printed substrate 7 as described below.

Figure 7:
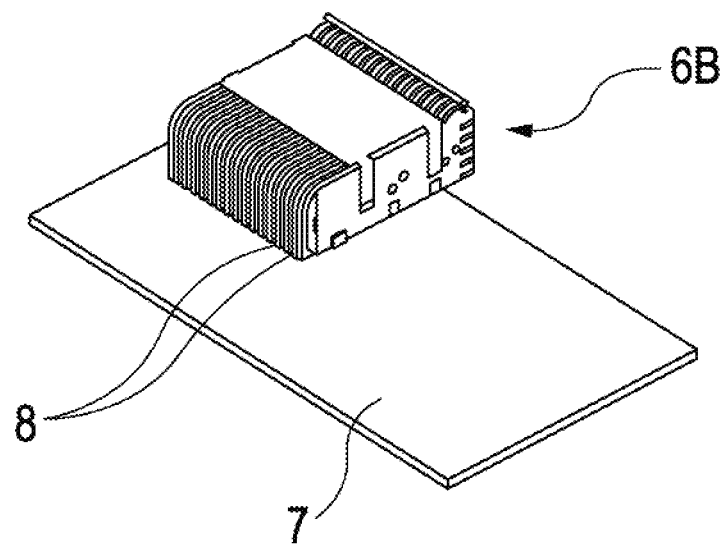
FIG. 7 is a perspective view of a two-storied type SFP cage mounted on the printed substrate viewed from the rear side.
Figure 8:
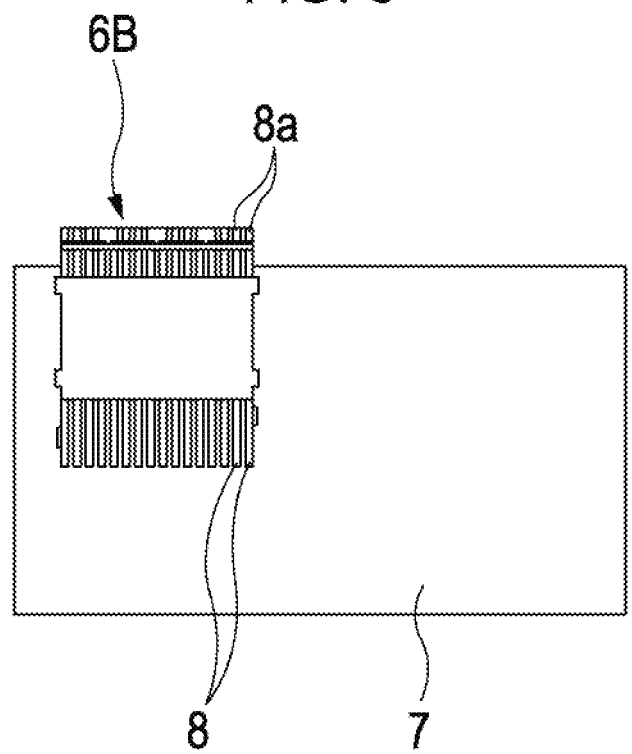
FIG. 8 is a plan view of the two-storied type SFP cage mounted on the printed substrate.
Figure 9:
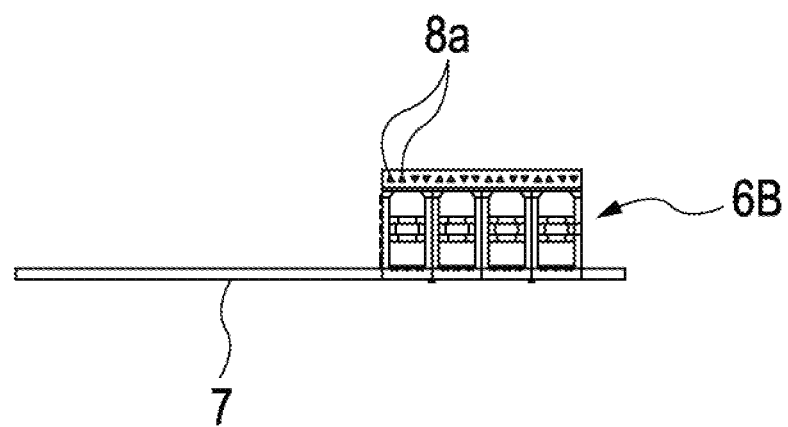
FIG. 9 is a front view of the two-storied type SFP cage mounted on the printed substrate.
Figure 10:
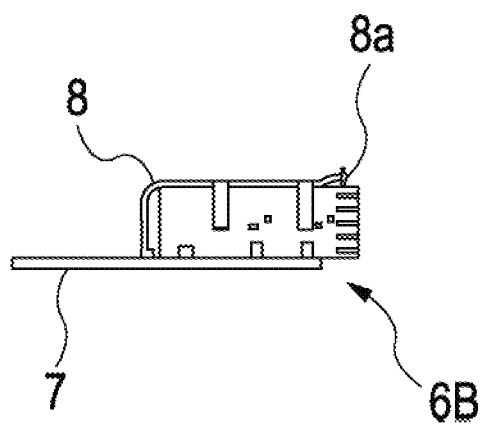
FIG. 10 is a side view of the two-storied type SFP cage mounted on the printed substrate.

FIGS. 7 to 9 are each a diagram for illustrating the SFP cage 6B illustrated in FIG. 2. FIG. 7 is a perspective view of the SFP cage 6B mounted on the printed substrate 5, and a state of the SFP cage 6B viewed from a rear side is illustrated. FIG. 8 is a plan view of the SFP cage 6B mounted on the printed substrate 5. Note that in FIGS. 7 and 8, the printed substrate 5 is illustrated to have a rectangular shape for simplification. Further, FIG. 9 is a front view of the SFP cage 6B mounted on the printed substrate 5, and FIG. 10 is a side view of the SFP cage 6B mounted on the printed substrate 5.

As illustrated in FIGS. 7 to 10, the light guide 8 is arranged at the outer side of the SFP cage 6B, rises up from the vicinity of the printed substrate 5 at the rear side of the SFP cage 6B, follows the upper surface of the SFP cage 6B, and extends to the display part 8a near the front surface of the SFP cage 6B. In the example illustrated in FIGS. 7 to 10, the connection parts into which the SFP modules 9 are inserted to be connected are overlapped two by two, and two light guides 8 are adjacently provided to correspond to the positions of the two connection parts. Accordingly, the same number of the light guides 8 as the number of the connection parts of the SFP cages 6B are equipped.

In addition, the plurality of light guides 8 are connected by a coupling unit that crosses the light guide 8 so as to be formed as a monolithic component. In this manner, the plurality of light guides 8 are attached to one of the SFP cages 6B as a monolithic component. An LED as the light emitting element is provided between an end (light receiving surface) of each light guide 8 and the printed substrate 7 as described below.

Figure 11:
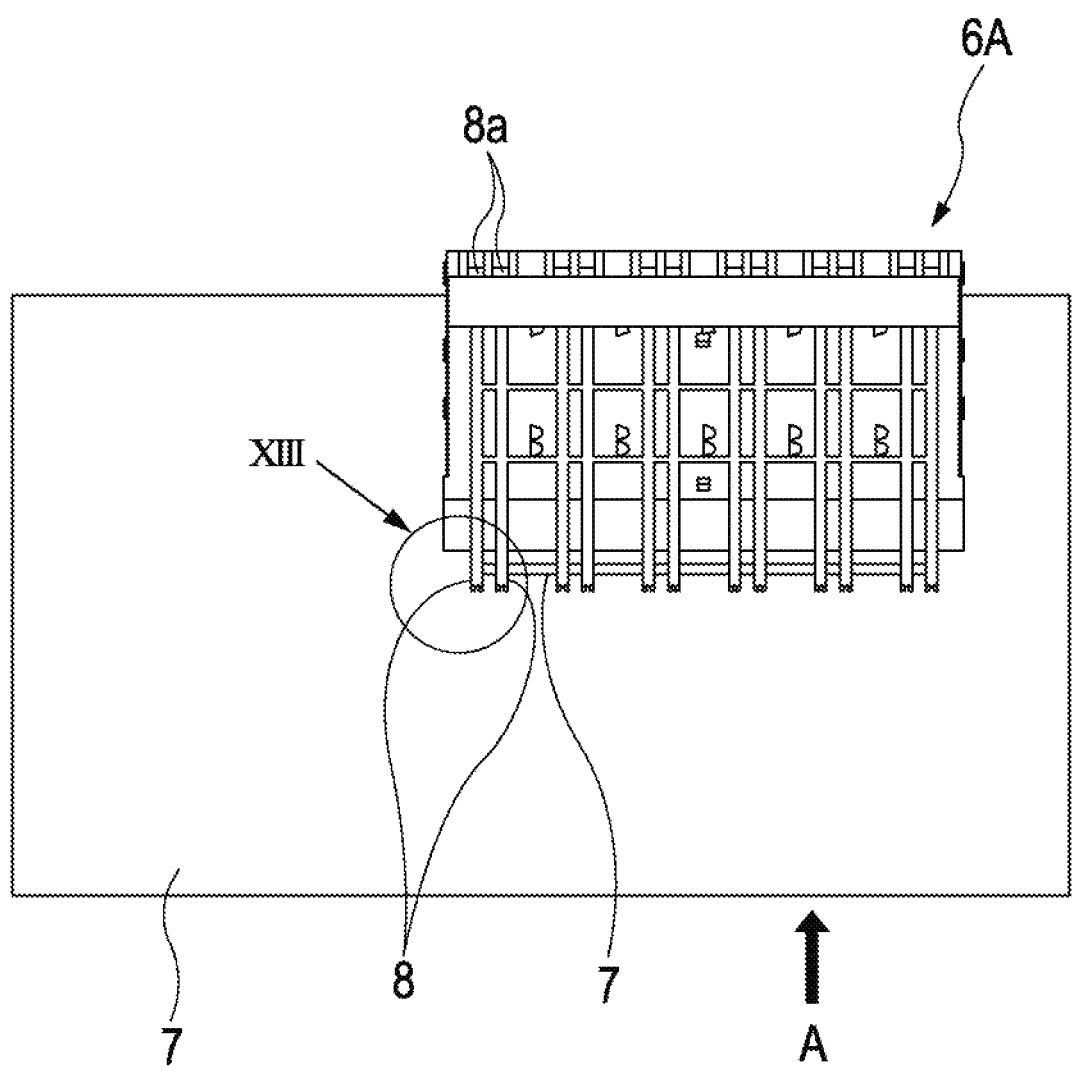
FIG. 11 is an enlarged plan view illustrating the SFP cage illustrated in FIG. 4.
Figure 12:
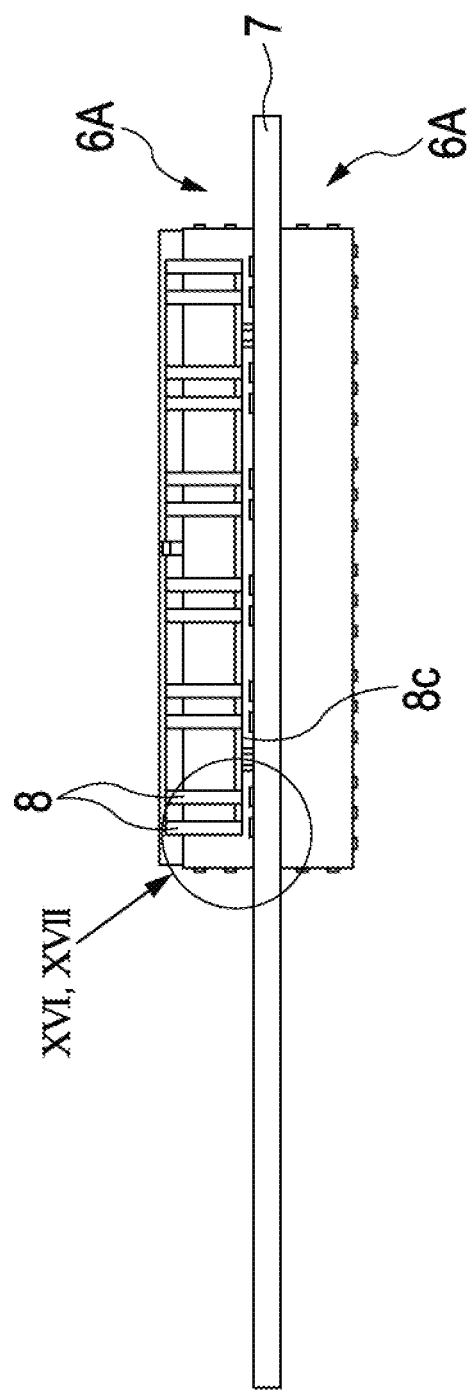
FIG. 12 is a diagram viewed from the arrow A direction of FIG. 11.

Next, a positional relationship between the LED as the light emitting element mounted on the printed substrate 7 and the light guide 8 will be described. FIG. 11 is an enlarged plan view illustrating the SFP cage 6A illustrated in FIG. 4, and FIG. 12 is a diagram of FIG. 11 viewed from the direction of arrow A. Further, FIG. 13 is an enlarged diagram illustrating the portion surrounded by the circle of FIG. 11.

Figure 13:
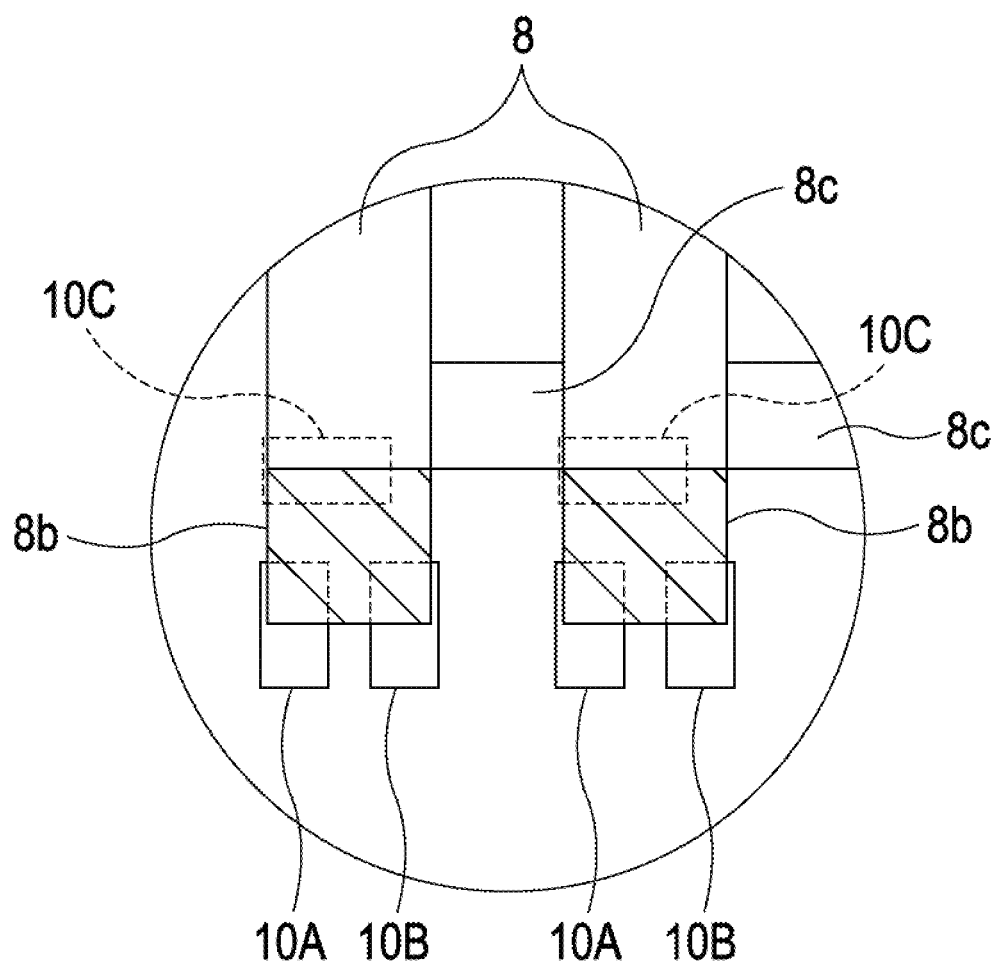
FIG. 13 is an enlarged view illustrating the portion surrounded by the circle of FIG. 11.

As illustrated in FIG. 13 in detail, three light emitting elements of a read LED 10A, a green LED 10B, and an orange LED are disposed below the end face (light receiving surface) 8b of each light guide 8. The read LED 10A, the green LED 10B, and the orange LED are implemented to be disposed on the printed substrate 7 on which the SFP cage 6A is mounted. One light guide 8 is provided with respect to one connection part (that is, one SFP module 9) of the SFP cage 6A. Since two connection parts are arranged in an overlapped manner, two light guides 8a are closely provided. Accordingly, two pairs of LED's, the pair being formed by three LED's of red, green, and orange, are closely provided on the printed substrate 7.

In the example illustrated in FIG. 11, since there is 12 connection parts in total in two SFP cages 6A, 12 light guides 8 are provided, and 12 light guides 8 are coupled by the coupling unit 8c to be united.

Figure 14:
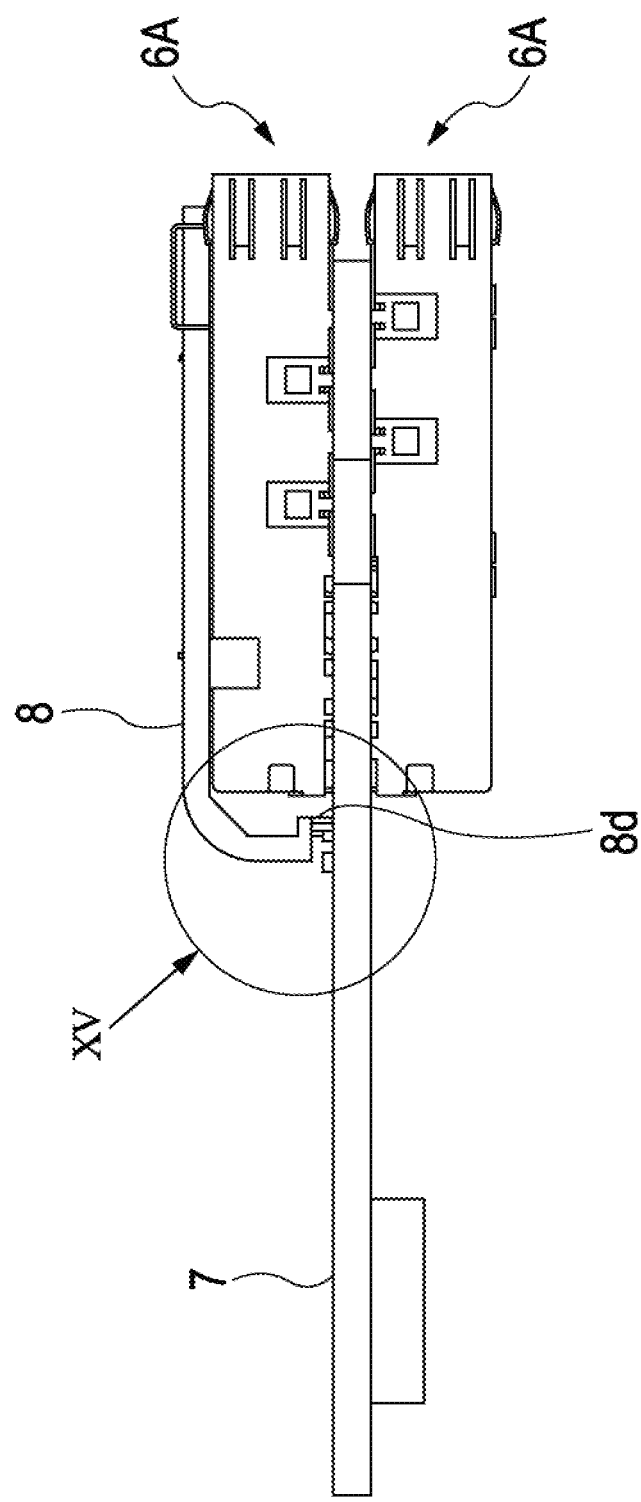
FIG. 14 is a side view of the SFP cage in the state where mounted on the printed substrate illustrated in FIG. 11.
Figure 15:
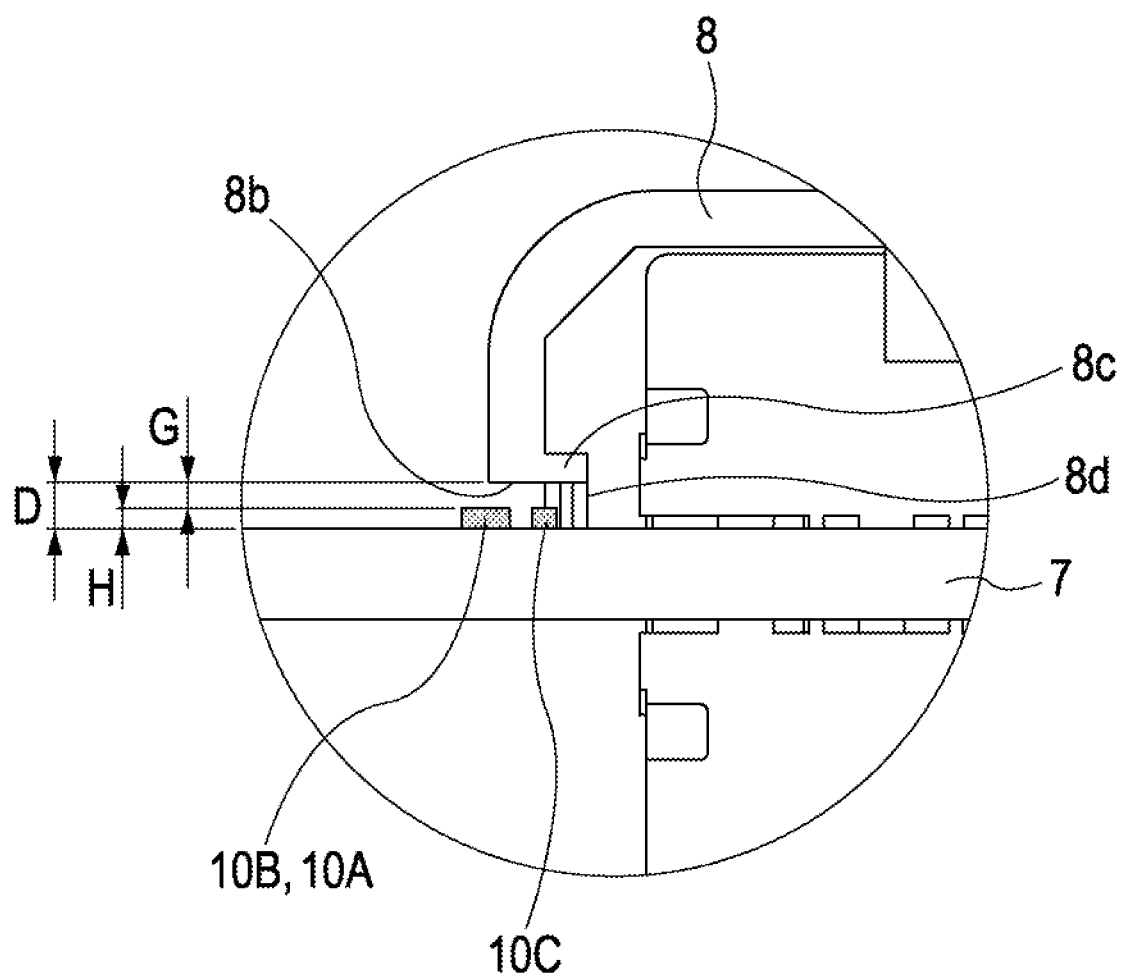
FIG. 15 is an enlarged view illustrating the portion surrounded by the circle of FIG. 14.

FIG. 14 is a side view of the SFP cage 6A in the state where mounted on the printed substrate 7 illustrated in FIG. 11, and FIG. 15 is an enlarged diagram illustrating the portion surrounded by the circle of FIG. 14.

As illustrated in FIG. 15, the coupling unit 8c of the light guides 8 extends in the direction in which the light guides 8 are aligned near the light receiving surfaces 8b of the light guides 8. A contact part 8d extends toward the printed substrate 7 from a portion of the coupling unit 8c, and the distal end of the contact part 8c is made contact with the printed substrate 7.

As described above, the status indicator for displaying an operation state of each SFP module of the optical transmission apparatus is formed by the LED's (light emitting elements) mounted on the printed substrate 7, and the light guides 8 that introduces the light from the LED's from the light receiving surfaces 8b to the display parts 8a.

The distance D from the light receiving surface 8b of the light guide 8 to the distal end of the contact part 8d is set larger than the height H of the red LED 10A, green LED 10B, and orange LED 10C so that the light receiving surface 8b is not made contact with the red LED 10A, green LED 10B, and orange LED 10C. Since there is a size variation in the red LED 10A, green LED 10B, and orange LED 10C, and a variation of the height H thereof when mounted on the printed substrate 7 is also large, the distance D is set fully larger than the height H. Accordingly, there exists a gap G between the upper surfaces of the red LED 10A, green LED 10B, and orange LED 10C and the right receiving surfaces 8b of the light guides 8.

Figure 16:
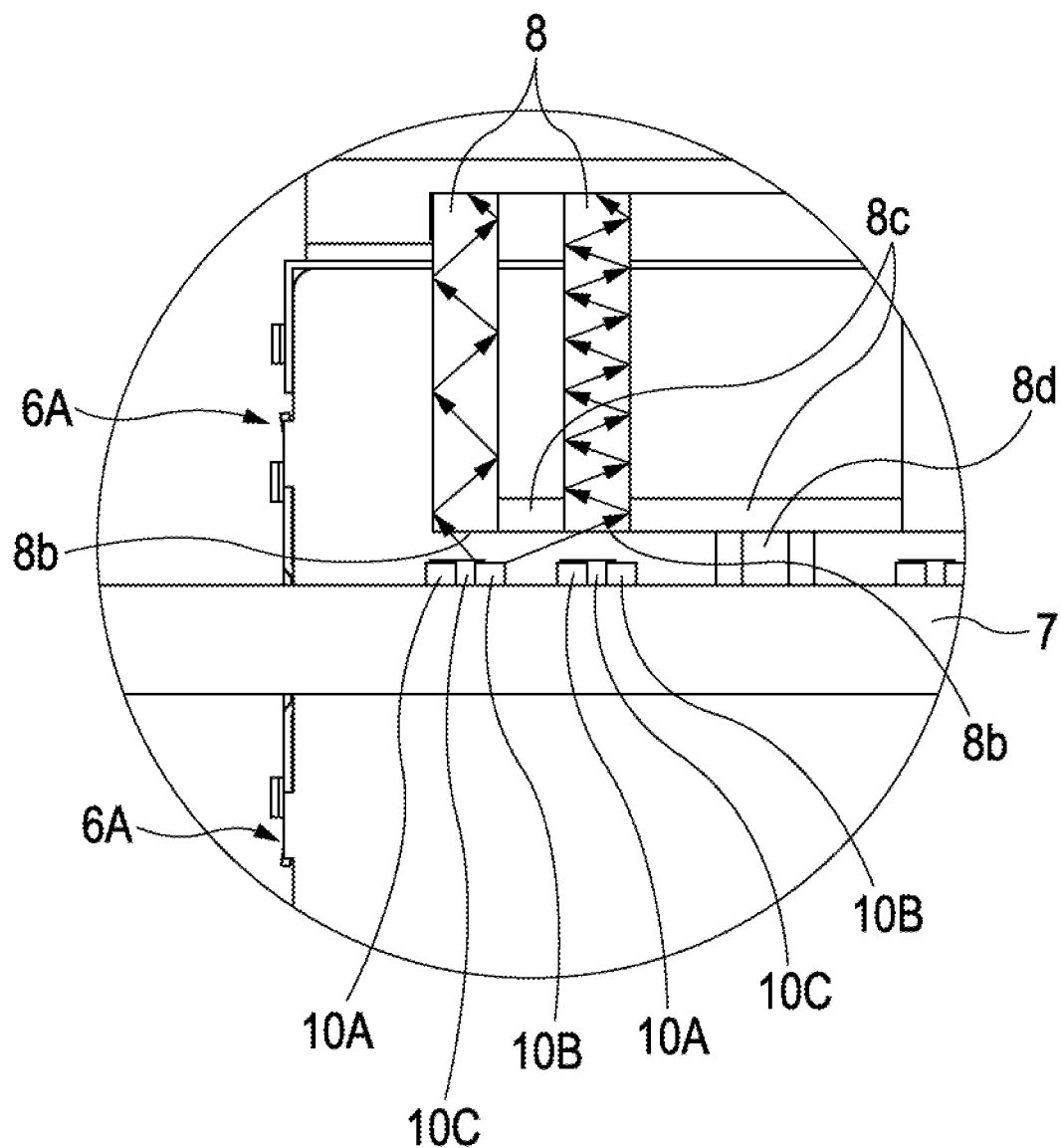
FIG. 16 is an enlarged view illustrating the portion surrounded by the circle of FIG. 12.

In this manner, since there exists the gap G, there is a risk that the light from the LED provided with respect to the adjacent light guide 8 is leaked and introduced into one light guide 8. FIG. 16 is an enlarged diagram illustrating the portion surrounded by the circle of FIG. 12. In FIG. 16, the light emitted from the green LED 10B provided with respect to the light guide 8 at the left side is passed through the gap G and is introduced into the light receiving surface 8b of the adjacent light guide 8 at the right side. That is, when light is emitted from the LED corresponding to one light guide 8, there is a risk that the light is also introduced into the adjacent light guide 8 (the light may be also referred to as leaked light) and the display part 8a of the adjacent light guide 8 also emits light.

Figure 17:
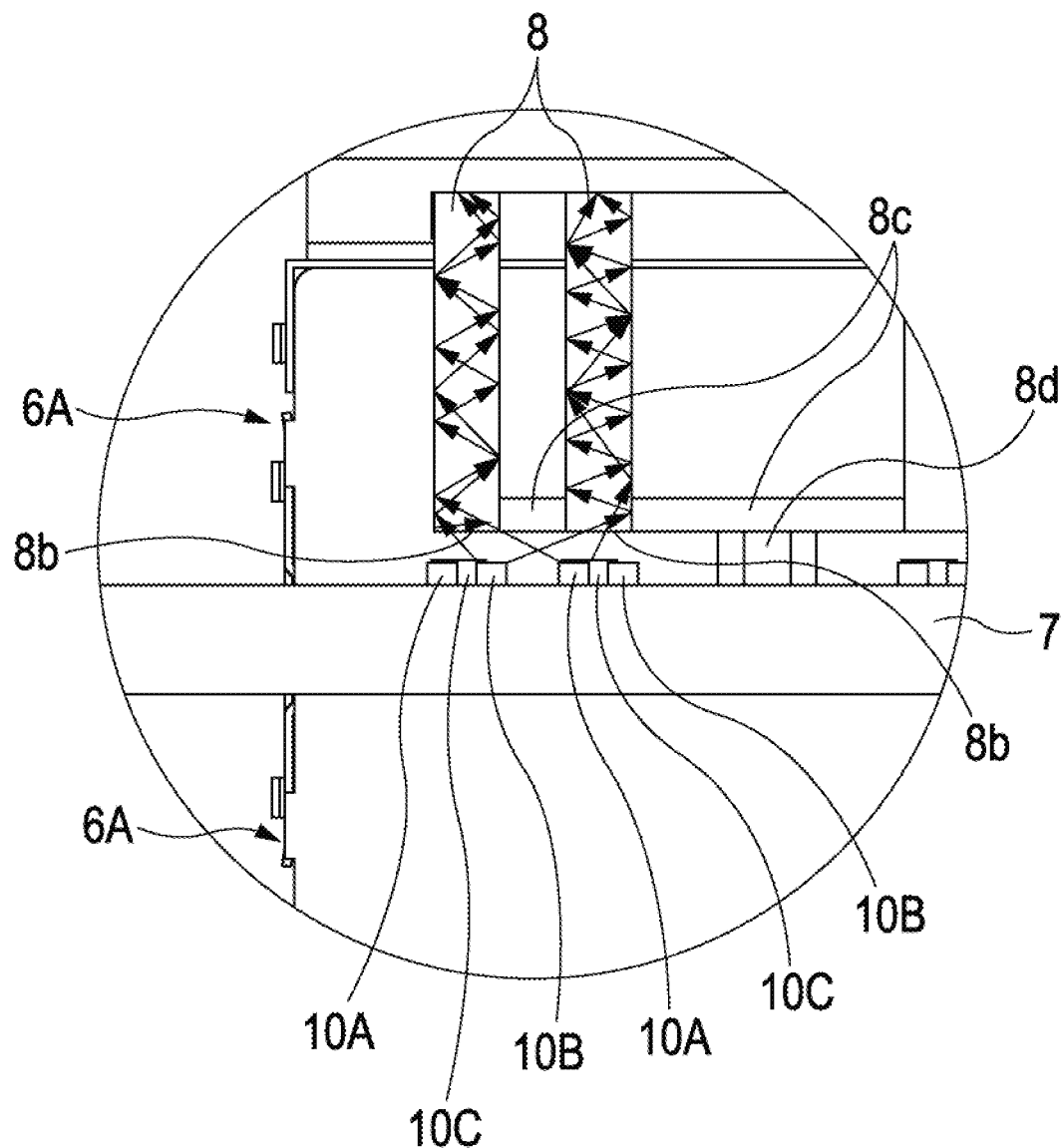
FIG. 17 is an enlarged view illustrating the portion surrounded by the circle of FIG. 12.

Further, as illustrated in FIG. 17, there is a case that the green LED 10B provided with respect to the light guide 8 at the left side emits light, and at the same time, the red LED 10A provided with respect to the light guide 8 at the right side emits light. In this case, as illustrated by the arrows of FIG. 17, there may occur a problem in that the light which should be introduced into the adjacent light guide 8 is introduced into each of the both light guides 8, and the emission color is changed. In the example illustrated in FIG. 17, the green LED 10B emits light with respect to the light guide 8 at the left side, and the red LED 10A emits light with respect to the light guide at the right side. In this case, green light is largely influenced by red light, so that the variation of the color is large. Accordingly, the original green light which should be emitted from the display part 8a of the light guide 8 at the left side is changed into orange due to mixing of the red light. Accordingly, there is a risk that the operator misidentifies that it is not the normal operation state illustrated by green and it is a waiting state illustrated by orange.

Consequently, in the status indicator according to the embodiment, a light shield for shielding the aforementioned leaked light is attached to the light guide 8 to prevent that the leaked light is not introduced into the light receiving surface 8b of the adjacent light guide 8.

Figure 18:
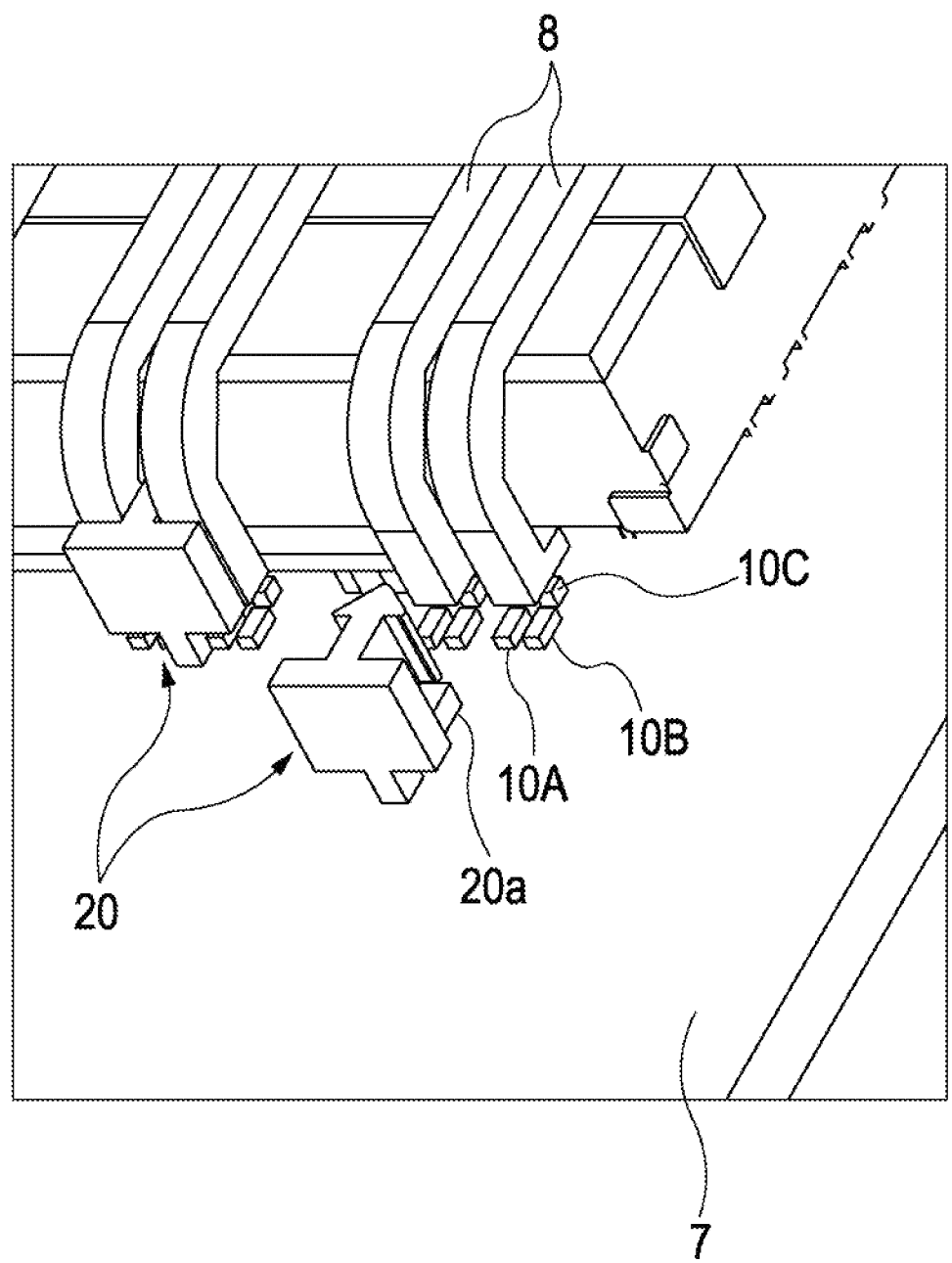
FIG. 18 is a perspective view illustrating light guides in the state where a light shield is attached.

FIG. 18 is a perspective view illustrating the light guides 8 in the state where a light shield 20 is attached thereto. The light shield 20 is formed by an elastic material such as a rubber, an elastic plastic, a foam material, or the like. Any material may be employed as far as the light shield 20 is formed by a non-transparent material to prevent transmission of light. The light shield 20 includes a light shielding part 20a which is a portion that is inserted between the adjacent light guides 8, and shields leakage of light by the light shielding part 20a.

Figure 19:
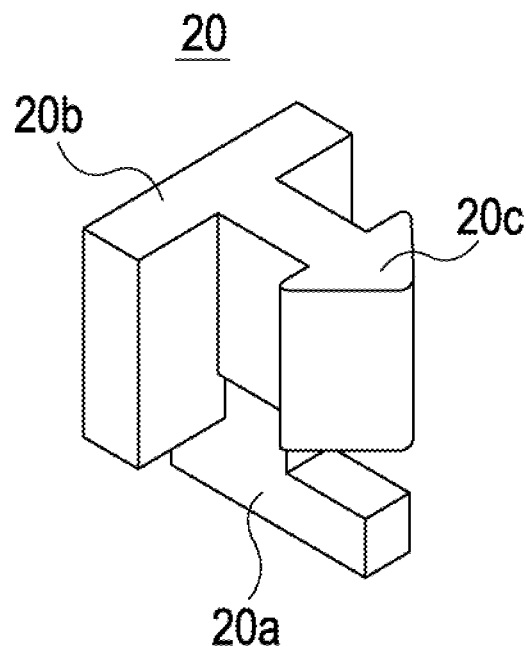
FIG. 19 is a perspective view of the light shield.
Figure 20:
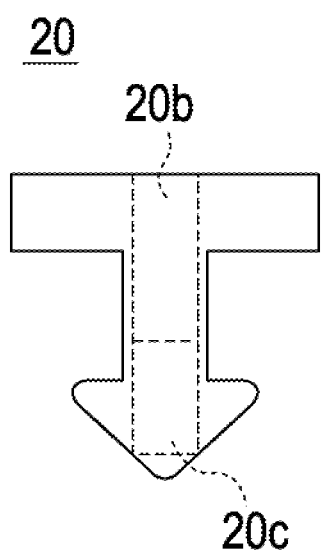
FIG. 20 is a plan view of the light shield.
Figure 21:
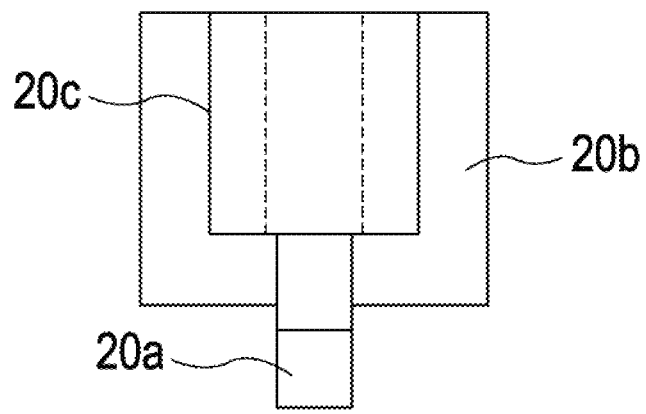
FIG. 21 is a front view of the light shield.
Figure 22:
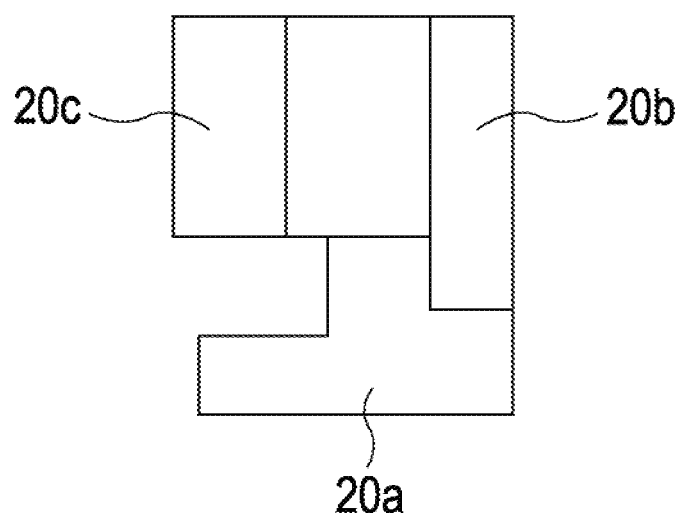
FIG. 22 is a side view of the light shield.

FIG. 19 is a perspective view of the light shield 20. Further, FIG. 20 is a plan view, FIG. 21 is a front view, and FIG. 22 is a side view of the light shield 20. The light shield 20 includes a support part 20b, and the light shielding part 20a extends in a vertical direction from the support part 20b. Further, an engage part 20c having an arrow shape in top view extends from the support part 20b in the vertical direction with respect to the support part 20b. Since the light shield 20 is formed by an elastic material, the engage part 20c can be inserted between the adjacent light guides 8 as illustrated in FIG. 18. The arrow shape of the engage part 20c is engaged with two light guides 8, and the light shield 20 is attached to the light guides 8. At this time, the light shielding part 20a extends between the right receiving surfaces of the adjacent LED's, so that leakage of the light from the LED can be shielded.

Figure 23:
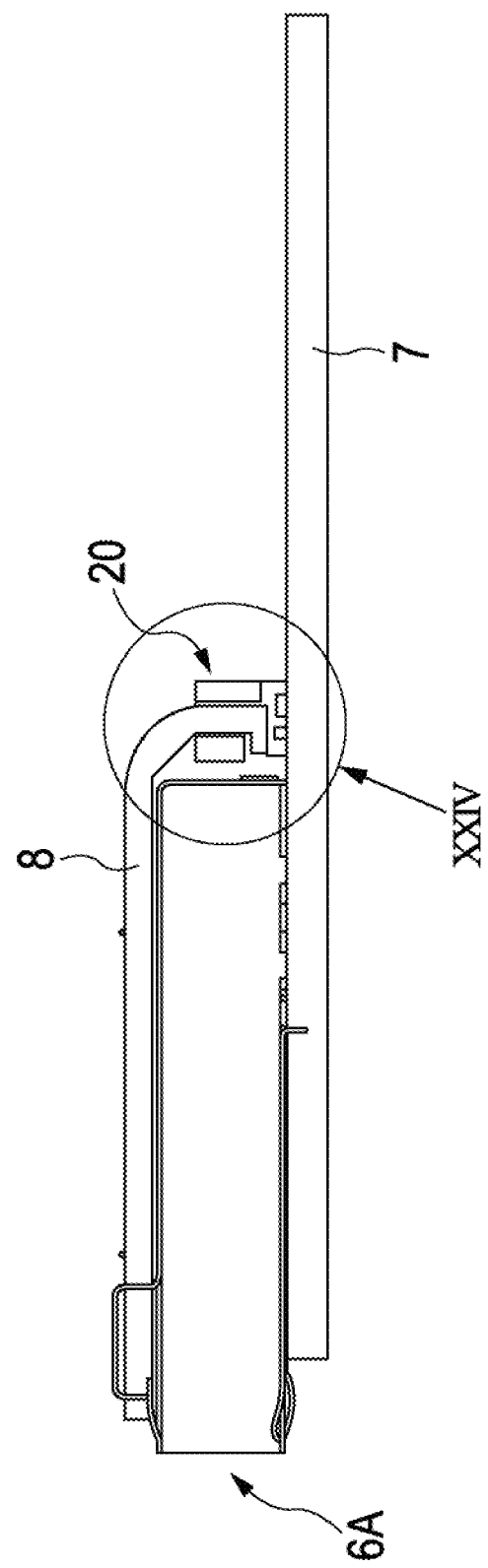
FIG. 23 is a side view of the light guide 8 to which the light shield is attached.
Figure 24:
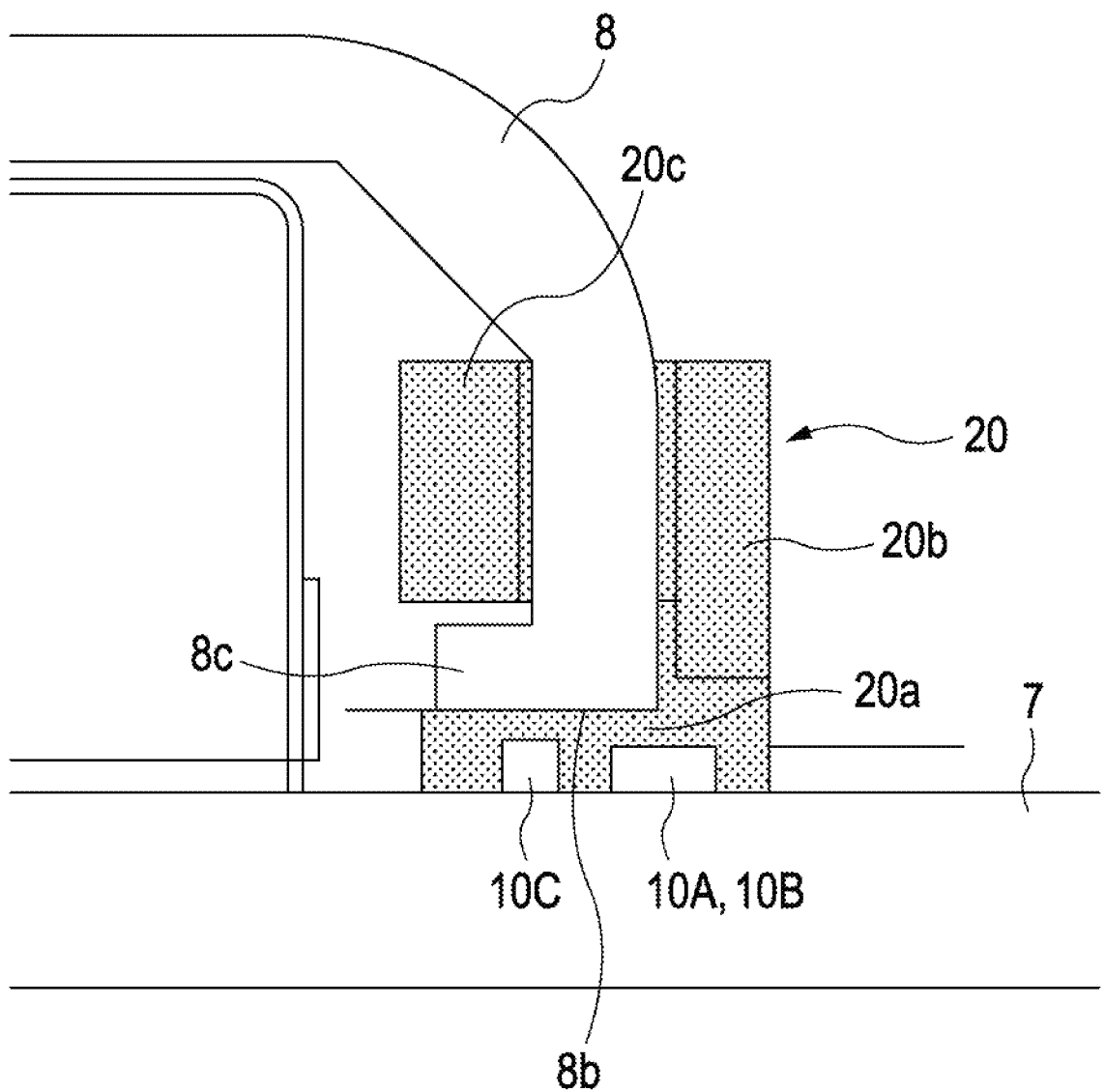
FIG. 24 is an enlarged view of the portion surrounded by the circle of FIG. 23.

FIG. 23 is a side view of the light guide 8 to which the light shield 20 is attached, and FIG. 24 is an enlarged view of the portion surrounded by the circle of FIG. 23. Furthermore, in FIG. 24, in order to clear up the light shield 20, the light shield 20 is subjected to hatching. When the light shield 20 is attached to the light guide 8, the light shielding part 20a of the light shield 20 is sandwiched between the coupling unit 8c of the light guide 8 and the printed substrate 7. The lower surface of the coupling unit 8c of the light guide 8 exist on the same plane as the right receiving surface 8b, and the gap whose distance is D as illustrated in FIG. 15 is provided between the lower surface of the coupling unit 8c of the light guide 8 and the printed substrate 7. The height of the light shielding part 20a of the light shield 20 has a size slightly larger than the distance D. Accordingly, the light shield 20 is inserted in the gap between the printed substrate 7 and the coupling unit 8c while being elastically compressed. Herewith, the height of the light shield 20a is positioned equal to or slightly higher than the height of the light receiving surface 8b in the state where the light shielding part 20a is inserted, so that leakage of light can be perfectly shielded.

Figure 25:
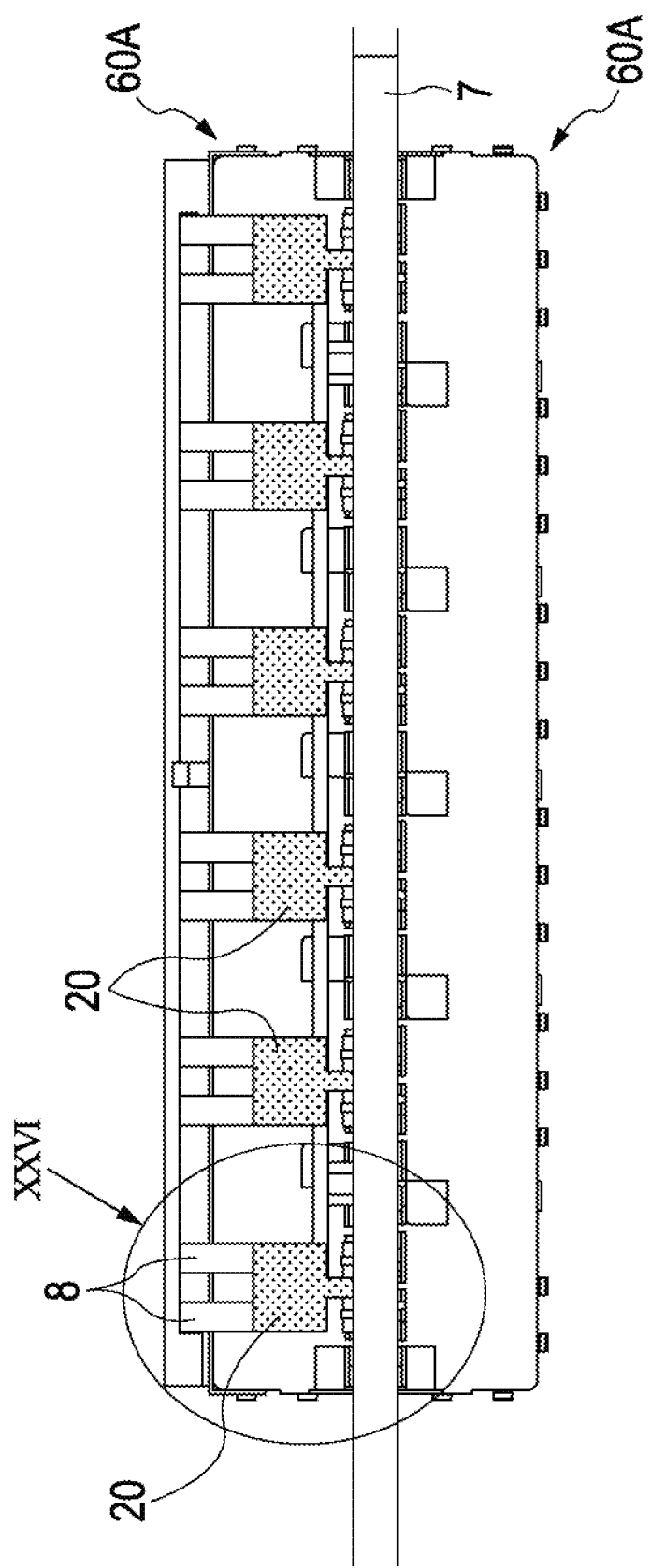
FIG. 25 is a diagram of the light guides in the state where the light shield is attached viewed from the rear side of an SFP cage 6A.
Figure 26:
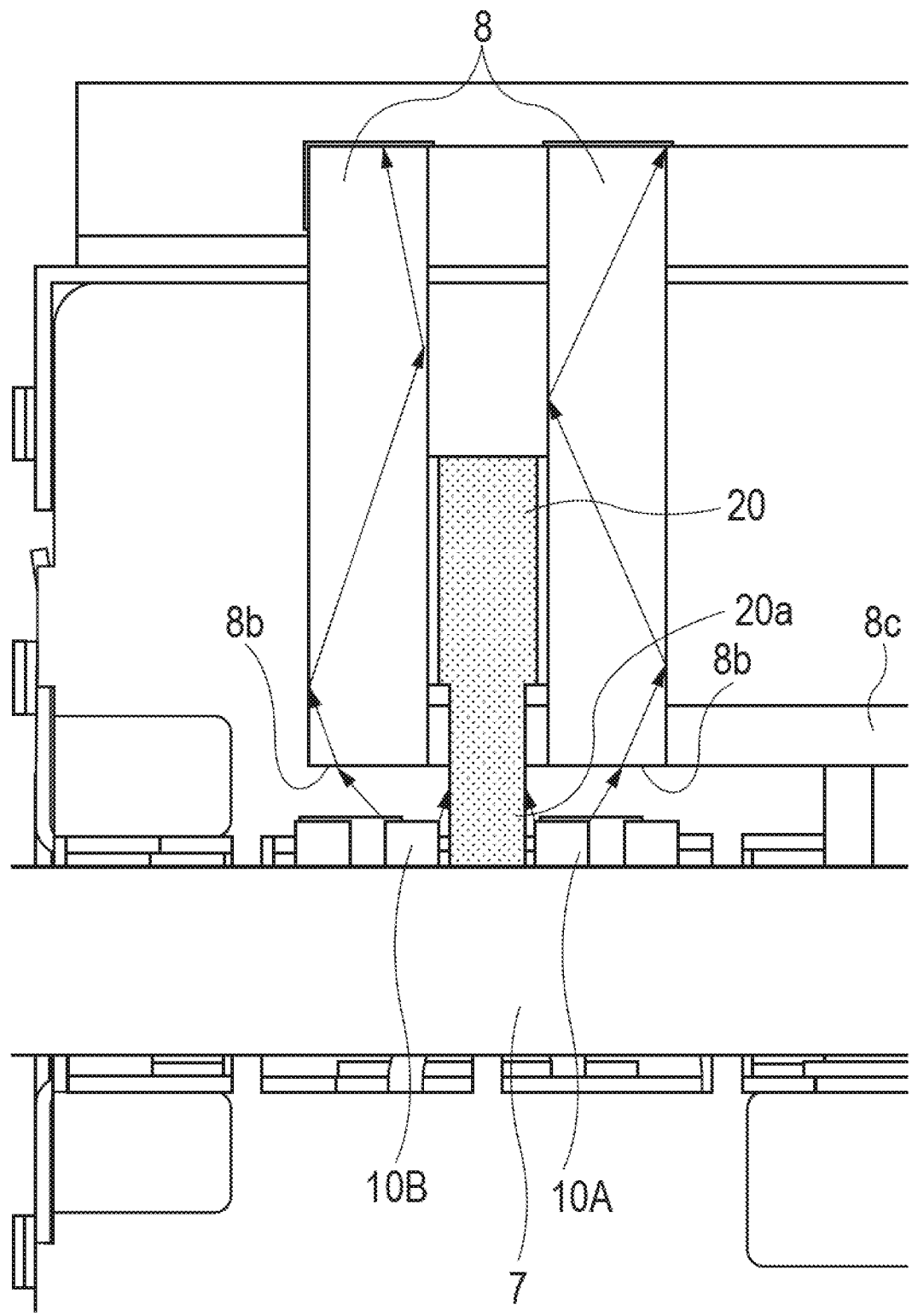
FIG. 26 is an enlarged view of the portion surrounded by the ellipse of FIG. 25.

FIG. 25 is a diagram illustrating the light guides 8 in the state where the light shield 20 is attached viewed from the rear side of the SFP package 6A, and FIG. 26 is an enlarged view of the portion surrounded by the ellipse of FIG. 25. In FIG. 26, in order to illustrate the light guide 8 hidden by the light shield 20, that state in which the support part 20b of the light shield 20 is cut and removed is illustrated.

As illustrated in FIG. 26, since the light shielding part 20a of the light shield 20 extends between the green LED 10B and the red LED 10A, the light from the green LED 10B is shielded by the light shielding part 20 and is not introduced into the light receiving surface 8b of the adjacent light guide 8. Further, the light from the red LED 10A is shielded by the light shielding part 20 and is not introduced into the light receiving surface 8b of the adjacent light guide 8 in the same way.

As described above, according to the status indicator according to the embodiment, only by adding a simple component, that is, only by attaching the light shield 20 to the light guide 8, leakage of light is shielded by the light shielding part 20a and it can be prevented that leaked light is introduced into the adjacent light guide 8, and the status indicator as it is performed by emission of the light emitting element can be performed. Further, since the light shield 20 is formed by an elastic material and can be easily attached to the existence right pipe 8, the light shield according to the embodiment can be inserted in a status indicator provided in a plug-in unit of an existing optical transmission apparatus.

Furthermore, the allocation of the LED's of three colors corresponding to one light guide 8 is not limited to the aforementioned allocation. For example, the red LED and the green LED may be interchanged, and any allocation may be employed. Further, the combination of thee colors is not limited to red, green and orange, and any color combination may be employed. Further, the status indicator in which status indicator is performed by only one LED that emits light of a plurality of colors may be employed. Alternatively, one LED that emits light of a single color may be employed.

The status indicator having the light shield 20 is described above by exemplifying the light guide 8 according to the SFP package 6A of a double side mount type. However, the aforementioned light shield 20 can be attached also to the light guide 8 of the SFP cage 6B of a two-storied type.

Next, modifications of the light shield 20 will be described.

Figure 27:
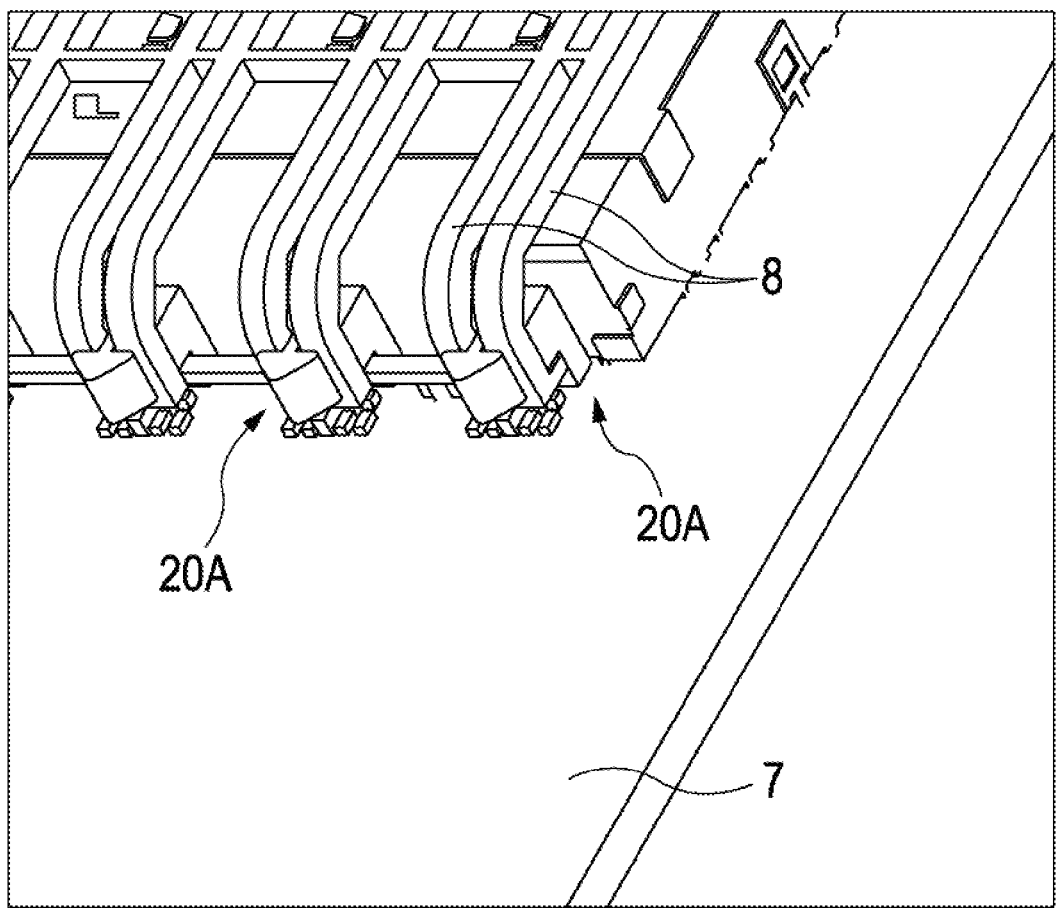
FIG. 27 is a perspective view of the light guides in the state where a light shield having a shape for which a support part is disposed at the back side of the light guide is attached.
Figure 28:
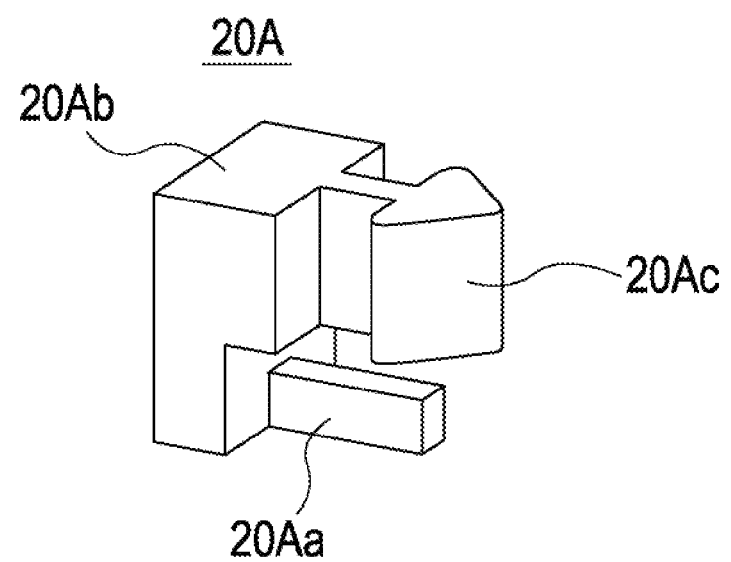
FIG. 28 is a perspective view of the light shield illustrated in FIG. 27.

FIG. 27 is a perspective view of the light guides 8 in the state where light shields 20A each having the shape for which the support part is disposed at the back side of the light guide 8 are attached. FIG. 28 is a perspective view of the light shield 20A illustrated in FIG. 27. A support part 20Ab of the light shield 20A is disposed at the back side of the light guide 8, that is, between the light guide and the rear surface of the SFP cage 6A. Accordingly, a light shielding part 20Aa and an engage part 20Ac extend between the light guides 8 from the back side of the light guides 8. In this case, since the light shield 20A can not be attached from the front side of the light guide 8, before the SFP cage 6A is attached to the printed substrate 7, the light shield 20A is inserted between the light pips 8 from the lower side of the adjacent two light guides 8 for attachment. The light shield 20A attached in this manner is not slipped from between the light guides 8 even when pulled by a large force, and can be surely attached between the light guides 8.

Figure 29:
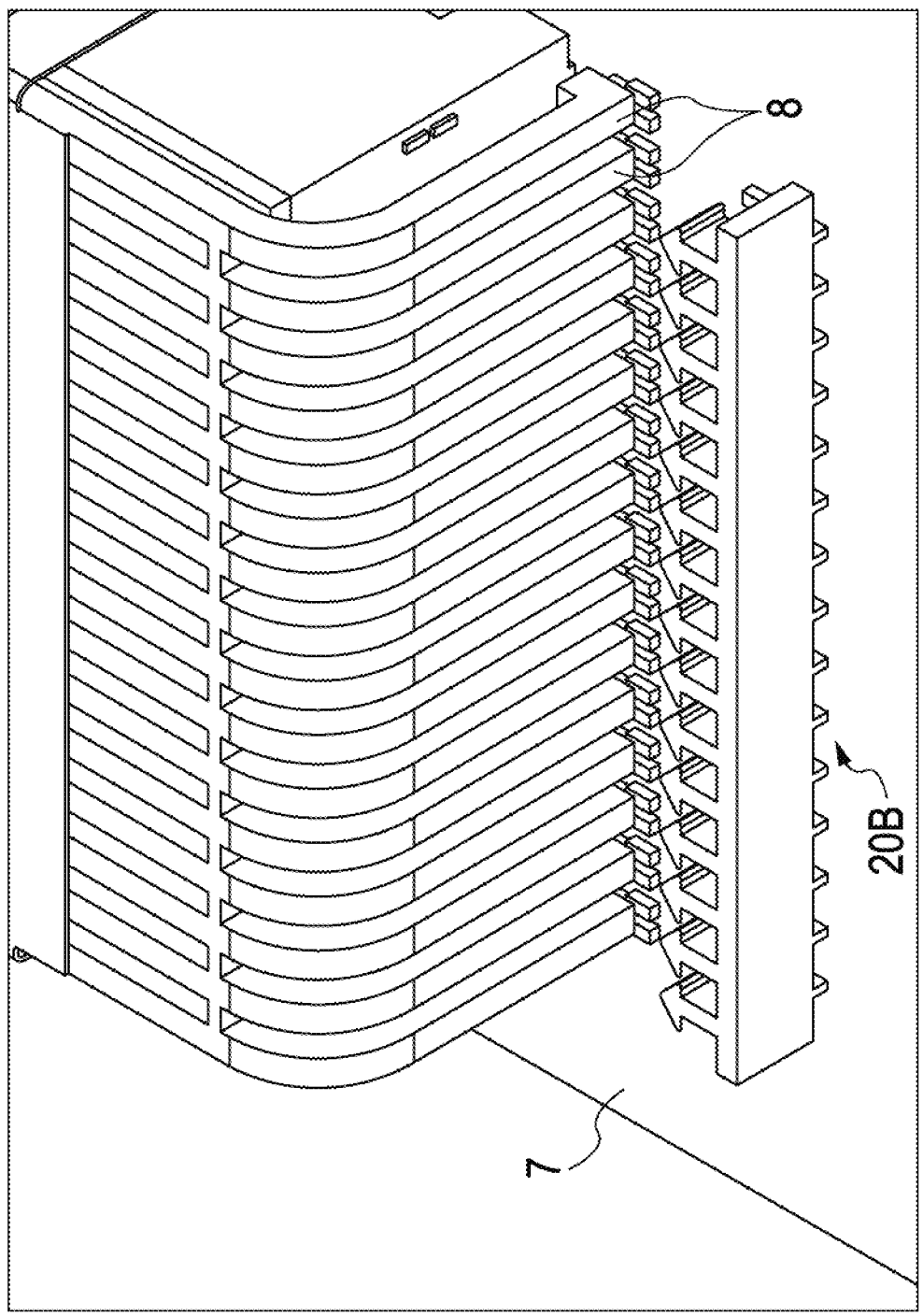
FIG. 29 is a perspective view of a light shield having a shape in which a plurality of light shielding parts and a plurality of engage parts are extended from one support part.

FIG. 29 is a perspective view of a light shield 20B having a shape in which a plurality of light shielding parts 20Ba and a plurality of engage parts 20Bc are extended from one support part 20Bb. In the example illustrated in FIG. 29, the light shield 20B has a shape in which 15 light shielding parts 20Ba and 15 engage parts 20Bc are extended from one elongated support part 20Bb so as to be entered between all of 16 light guides 8. That is, the light shielding part 20Bb has a shape in which 15 light shields 20 illustrated in FIG. 19 are aligned and united. In this case, by attaching only one light shield, the light shielding parts 20Ba can be disposed to all of the light guides 8 at once, the number of assembling processing is reduced, and the number of components is reduced.

Figure 30:
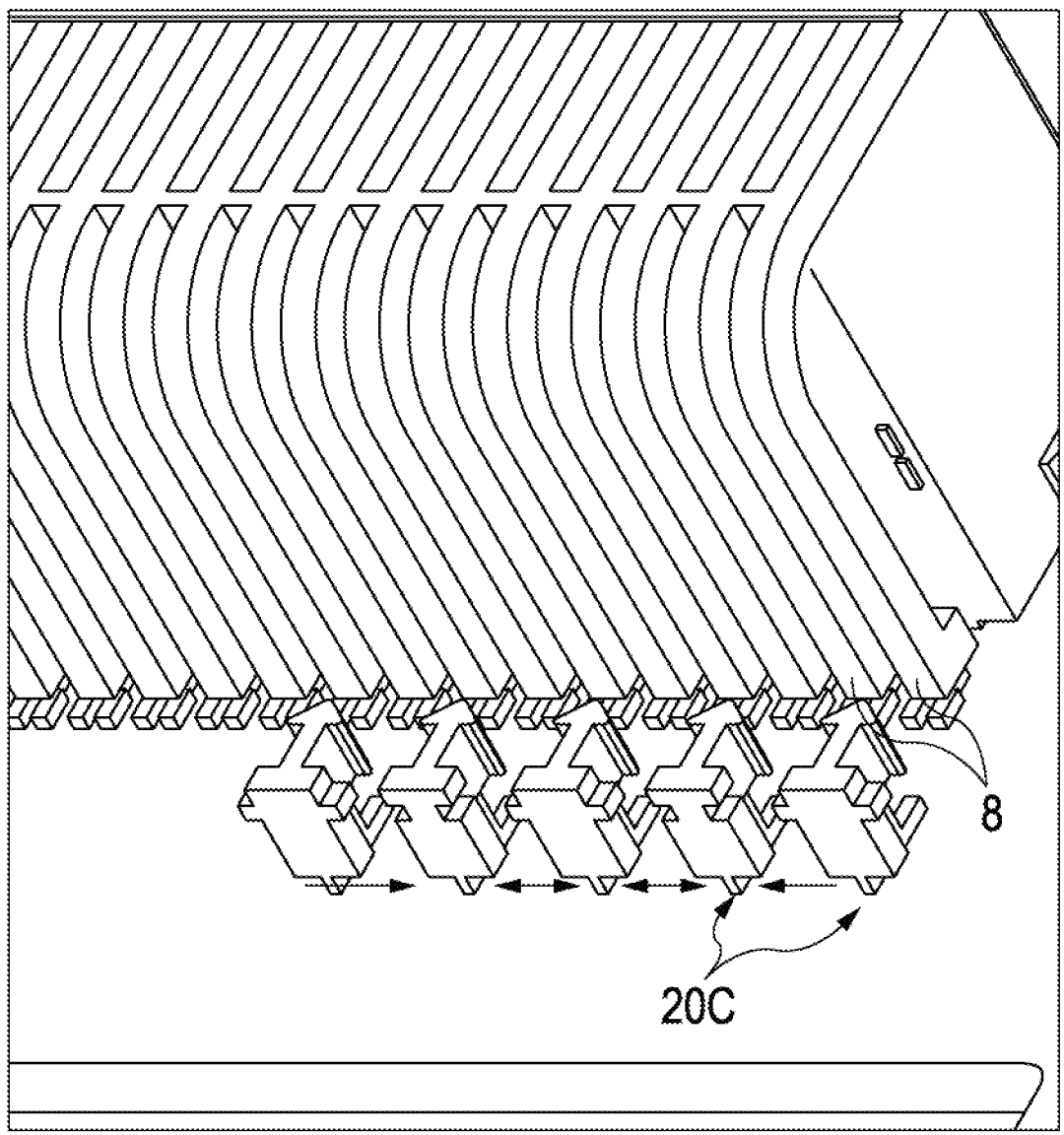
FIG. 30 is a perspective view of light shields having shapes by which the plurality of light shields can be coupled.
Figure 31:
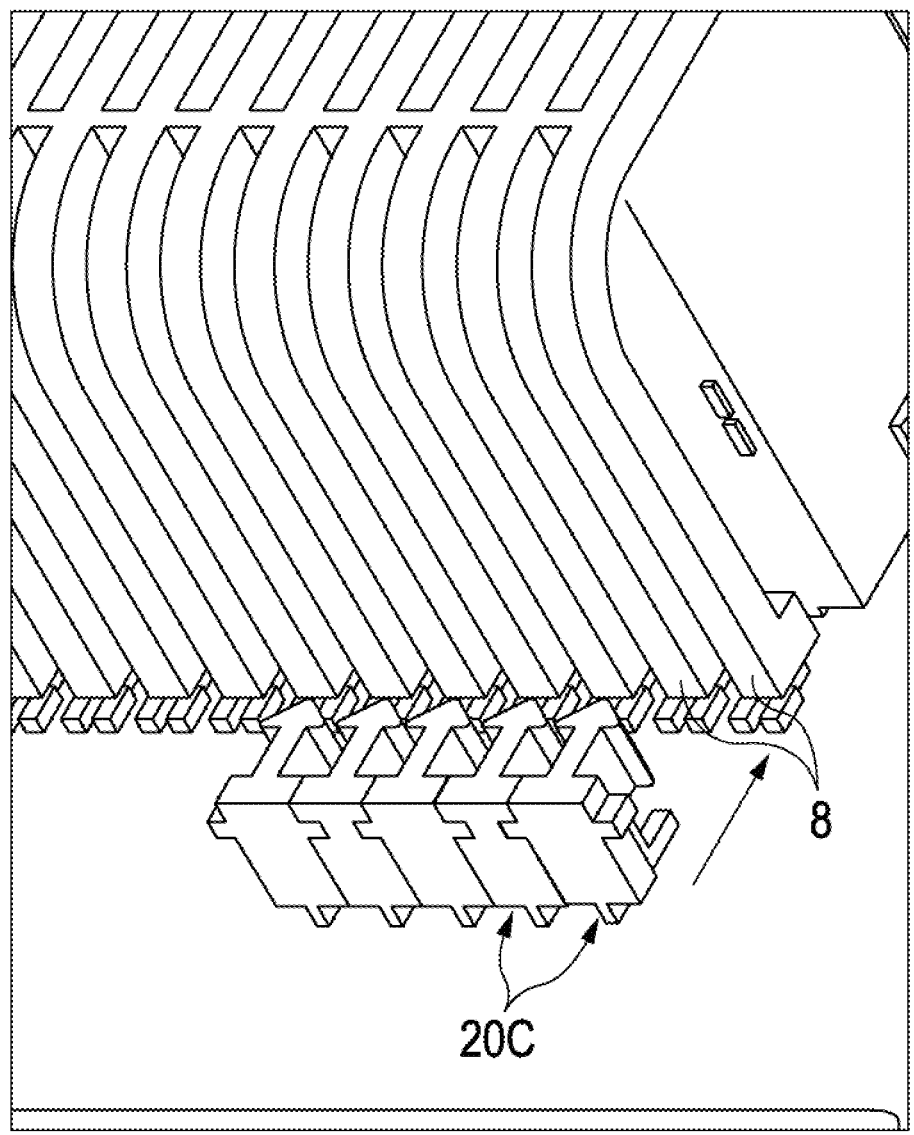
FIG. 31 is a perspective view illustrating the state where five light shields are coupled and united.

FIG. 30 is a perspective view of a light shield 20C having the shape by which a plurality of light shields can be coupled. By combining a convex and a concave of the light shields 20, any number of light shields 20C can be coupled and united. FIG. 31 is a perspective view illustrating a state in which five light shields 20C are coupled and united. Note that the light shields 20C illustrated in FIGS. 30, 31 includes a light shield 20C having a convex at the both side and a light shield 20C having a concave at the both side. However, the light shields 20C having a convex at one side and a concave at the opposite side may be employed.

FIG. 32 is a perspective view of the light shield 20B on which numbers are displayed on the upper surface in the state where attached to the light guides 8. The numbers are displayed at the positions corresponding to each light guide 8, and illustrate the number of each light guide 8. The number of the light guide 8 corresponds to the number of each connection part of the SFP cage 6B. Accordingly, the number illustrates the number of the SFP module 9 connected to each connection part. The number can be provided to the light shield 20B by carving the number when forming the light shield 20B. Alternatively, after the light shield 20B is formed, the number may be printed on the upper surface thereof by a silk screen or the like.

By providing the number on the light shield, when performing, for example, a maintenance operation, when the operation is performed from the back side of the SFP cage 6B, it becomes not necessary to look the display unit 8a at the front side of the SFP cage 6B in order to confirm the operation state of each SFP cage 6B, so that the maintenance operation becomes easy. For example, when confirming the operation state of the optical module of No. 1 connected to the SFP cage 6B, what is necessary is to confirm the color of the light guide 8 at the position at which "1" is illustrated of the light shield 20B. Accordingly, the operation state of the optical module can be confirmed also from the back side of the SFP cage 6B.

According to the aforementioned status indicator, leakage of light into the adjacent optical guide member is prevented with a simple structure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. A device for indicating a device status, comprising:
   a substrate;
   a plurality of light emitting elements arranged on the substrate;
   a plurality of light guides, each of the plurality of light guides including a first end for receiving light from a corresponding light emitting element and a second end for displaying light; and
   a light shield arranged between the light guides and extending between light emitting elements, wherein
   the light shield includes:
      a support part;
      an engage part to be inserted between adjacent light guides of the plurality of light guides so as to be engaged with the adjacent light guides; and
      a light shielding part extending in a vertical direction from the support part, extending from the engage part to between the adjacent light emitting elements corresponding to the adjacent light guides, and to be inserted in a gap between the substrate and the first end of the light guide so as to shield leakage of light from adjacent light emitting elements.

2. The device of claim 1, wherein the light shield is formed of an elastic substance.

3. The device of claim 2, wherein the engage part has an arrow-shaped part that has an effective shape for attaching the engage part to the adjacent light guides and detaching the engage part from the adjacent light guides.

* * * * *